(12) United States Patent
Lukawski et al.

(10) Patent No.: US 9,021,345 B2
(45) Date of Patent: Apr. 28, 2015

(54) MANAGING REFERENCES RELATED TO PATENT APPLICATIONS

(75) Inventors: Marion Lukawski, Plymouth, MN (US); Benjamin S. Fernandez, Broomfield, CO (US); Thomas Anthony Gelbmann, Jr., Roseville, MN (US); Karen J. Hull, New Hope, MN (US); Victor Petersen Jonas, Cottage Grove, MN (US); Andrew James Koch, Shoreview, MN (US); Matthew John Mathieson, Minneapolis, MN (US); Mark Robert Raabe, Coon Rapids, MN (US); JoRae M. Stockdale, Rosemount, MN (US); Johnathan Andrew Tinnen, Bloomington, MN (US); William K. Weimer, Woodbury, MN (US)

(73) Assignee: Faegre Baker Daniels LLP, Minneapolis, MN (US)

( * ) Notice: Subject to any disclaimer, the term of this patent is extended or adjusted under 35 U.S.C. 154(b) by 169 days.

(21) Appl. No.: 13/456,513

(22) Filed: Apr. 26, 2012

(65) Prior Publication Data
US 2013/0290824 A1 Oct. 31, 2013

(51) Int. Cl.
*G06F 17/00* (2006.01)
*G06Q 50/18* (2012.01)

(52) U.S. Cl.
CPC .................... *G06Q 50/184* (2013.01)

(58) Field of Classification Search
CPC ............... G06F 17/00; G06Q 50/18
USPC ................................. 715/200, 255
See application file for complete search history.

(56) References Cited

U.S. PATENT DOCUMENTS

| | | | |
|---|---|---|---|
| 5,671,428 A * | 9/1997 | Muranaga et al. ........... | 715/751 |
| 5,991,751 A | 11/1999 | Rivette et al. | |
| 6,339,767 B1 | 1/2002 | Rivette et al. | |
| 6,499,026 B1 | 12/2002 | Rivette et al. | |
| 6,963,920 B1 | 11/2005 | Hohmann et al. | |
| 7,437,471 B2 | 10/2008 | Hohmann et al. | |
| 7,523,126 B2 | 4/2009 | Rivette et al. | |
| 7,949,728 B2 | 5/2011 | Rivette et al. | |
| 2002/0059076 A1 | 5/2002 | Grainger et al. | |
| 2002/0065675 A1 | 5/2002 | Grainger et al. | |
| 2002/0065676 A1 | 5/2002 | Grainger et al. | |
| 2002/0065677 A1 | 5/2002 | Grainger et al. | |
| 2002/0072920 A1 | 6/2002 | Grainger | |
| 2002/0093528 A1 | 7/2002 | Grainger | |
| 2002/0111824 A1 | 8/2002 | Grainger | |
| 2002/0111953 A1 | 8/2002 | Snyder | |
| 2002/0161733 A1 | 10/2002 | Grainger | |
| 2003/0163492 A1* | 8/2003 | Slifer ........................... | 707/204 |
| 2003/0167181 A1 | 9/2003 | Lundberg et al. | |

(Continued)

OTHER PUBLICATIONS

"What is IAM?" Anaqua, http://www.anaqua.com/iam-solutions/enterprise-iam.html, downloaded Jan. 4, 2012.

(Continued)

*Primary Examiner* — Cong-Lac Huynh
(74) *Attorney, Agent, or Firm* — Faegre Baker Daniels LLP

(57) ABSTRACT

A reference-management tool facilitates managing prior art references relating to one or more patent applications, which may be represented by matters. Interfaces can be presented to users to enable the users to group matters into clans, to associate references with matters, to automatically generate information disclosure statements (IDSs) and to track citations of references.

9 Claims, 12 Drawing Sheets

(56) References Cited

U.S. PATENT DOCUMENTS

| | | |
|---|---|---|
| 2005/0210042 A1 | 9/2005 | Goedken |
| 2005/0228684 A1* | 10/2005 | Pogodin et al. .................... 705/1 |
| 2005/0246194 A1 | 11/2005 | Lundberg |
| 2006/0059413 A1* | 3/2006 | Tran .............................. 715/500 |
| 2006/0290967 A1* | 12/2006 | Sumitomo et al. ........... 358/1.14 |
| 2007/0016431 A1* | 1/2007 | Desai et al. ........................ 705/1 |
| 2007/0078886 A1 | 4/2007 | Rivette et al. |
| 2007/0132660 A1* | 6/2007 | Nuttall ............................ 345/2.3 |
| 2007/0219939 A1 | 9/2007 | Van Luchene et al. |
| 2007/0219967 A1 | 9/2007 | Mueller et al. |
| 2007/0219988 A1 | 9/2007 | Mueller et al. |
| 2007/0220041 A1 | 9/2007 | Van Luchene et al. |
| 2007/0220105 A1 | 9/2007 | Van Luchene et al. |
| 2008/0033741 A1 | 2/2008 | Van Luchene et al. |
| 2008/0162165 A1 | 7/2008 | Jiang et al. |
| 2008/0183724 A1 | 7/2008 | Mueller |
| 2008/0270255 A1 | 10/2008 | Milone et al. |
| 2009/0070662 A1* | 3/2009 | Audet ............................ 715/212 |
| 2009/0150424 A1 | 6/2009 | Sheerin |
| 2009/0171905 A1 | 7/2009 | Garcia |
| 2009/0228497 A1 | 9/2009 | Ramakrishnan |
| 2009/0228518 A2 | 9/2009 | Wallace et al. |
| 2010/0153293 A1* | 6/2010 | Fox et al. ........................ 705/347 |
| 2010/0174720 A1 | 7/2010 | Mack |
| 2011/0072342 A1* | 3/2011 | Tran .............................. 715/273 |
| 2011/0161054 A1 | 6/2011 | Woolf et al. |
| 2011/0202502 A1* | 8/2011 | Takatsu et al. ................. 707/608 |
| 2011/0231449 A1* | 9/2011 | Ashley et al. .................. 707/800 |
| 2011/0246932 A1* | 10/2011 | Van Roy et al. ............... 715/780 |
| 2011/0258227 A1 | 10/2011 | Lacasse |
| 2011/0283177 A1* | 11/2011 | Gates et al. .................... 715/224 |
| 2013/0185621 A1* | 7/2013 | Oyarzabal et al. ............. 715/229 |

OTHER PUBLICATIONS

Computer Packages Inc., Patent Management System, http://www.computerpackages.com/patent_system.asp, downloaded Jan. 4, 2012.

First to file, Electronic File Room, http://www.firsttofile.com/?page_id=57, downloaded Jan. 4, 2012.

Lecorpio, Bring Structure to Your Processes, http://www.lecorpio.com/information-disclosure-statement-ids-management/, downloaded Jan. 4, 2012.

\* cited by examiner

MANAGING REFERENCES RELATED TO PATENT APPLICATIONS

SUMMARY

A reference-management tool facilitates managing and tracking prior art references related to patent applications. The tool, which can be implemented in a web services platform, an individual computing device, or the like, provides various graphical user interfaces to enable users to track citations of references related to patent applications, associate references with patent applications having similar subject matter, automatically generate information disclosure statements (IDSs), and perform other administrative tasks related to prior art references.

A dashboard interface provides navigable links to additional interfaces and notifications of pending references, pending IDSs, unfinished tasks, and the like. The tool can facilitate management of groups of patent applications (which may be represented by matters) referred to as clans. References associated with one matter in a clan can be automatically associated with other matters in the clan and/or in other clans to which the matter belongs. References associated with a matter can also be "pushed" to (associated with) other matters. The tool can track IDS filings so that, when automatically generating an IDS filing package, the tool only cites references that have not already been disclosed in the matter. Additionally, the tool can include a notification service that provides notifications to various users to inform the users of changes associated with matters, references, and the like.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 6 depicts an illustrative add references interface in accordance with embodiments of the invention;

FIG. 9 depicts an illustrative view matter interface showing a dialog box in accordance with embodiments of the invention;

Figure 10:
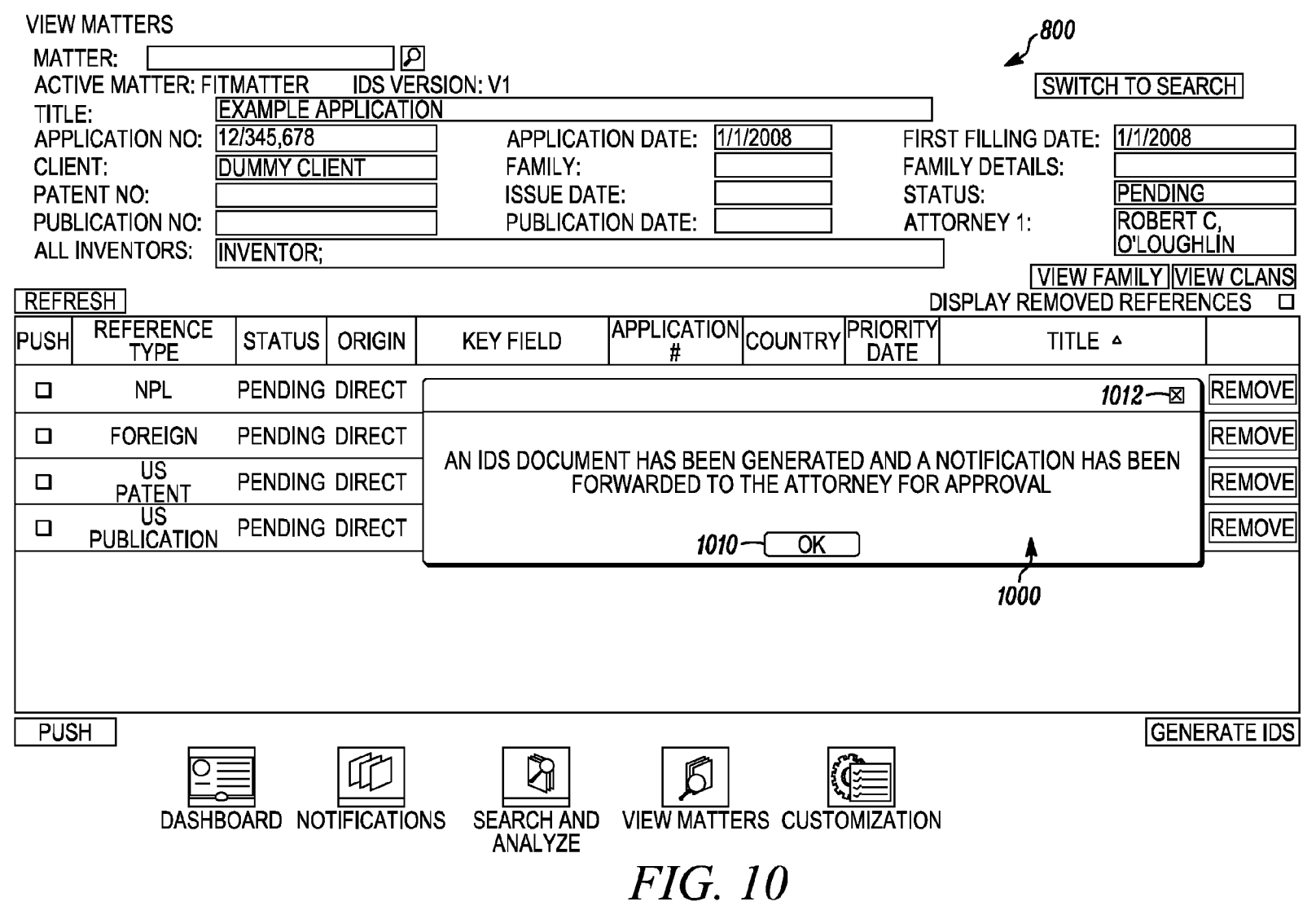

FIG. 10 depicts an illustrative view matter interface showing a dialog box in accordance with embodiments of the invention;

FIG. 11 depicts an illustrative review interface in accordance with embodiments of the invention.

Figure 1:
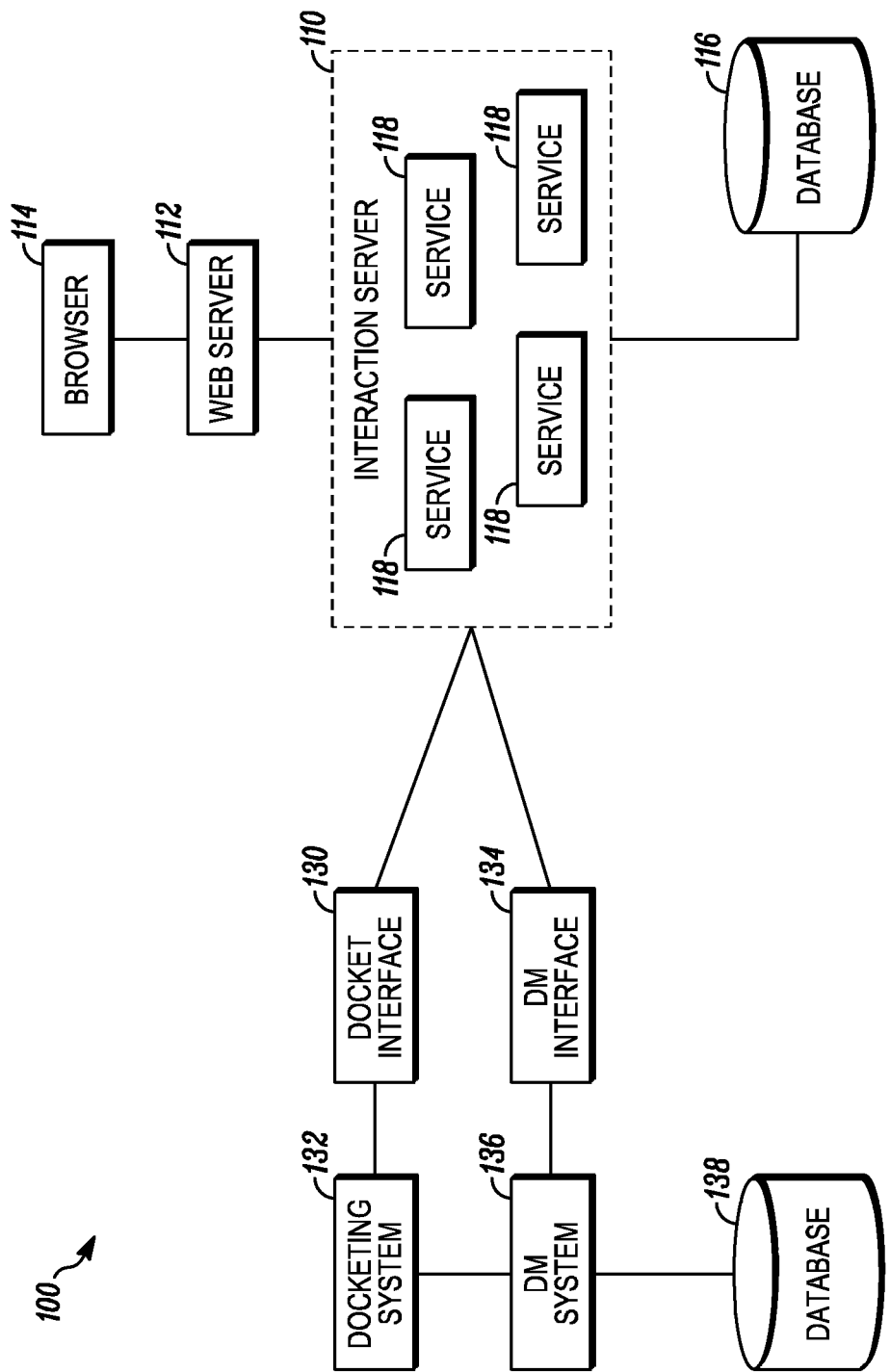
FIG. 1 is a block diagram depicting an illustrative operating environment in accordance with embodiments of the invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Embodiments of the invention include a reference-management tool that facilitates managing references associated with one or more patent applications. Each patent application may be associated with a matter, which may be designated by a matter number (e.g., a character string including numbers, letters, special characters, or a combination thereof). The tool facilitates tracking prior art references associated with a matter. Often, a patent application will be related to other patent applications according to family relationships (e.g., continuations, continuations-in-part, divisions, etc.). However, some patent applications may have subject matter that is similar to other patent applications, though they are not within the same family. Tracking references that may be relevant to applications with similar subject matter can be achieved using embodiments of the tool by associating patent applications (e.g., matters) with each other to form a clan. A clan is a user-specified grouping of matters. For example, a user (e.g., patent attorney, patent agent, etc.) may wish to include all patent applications of a family in a clan, to associate unrelated patent applications with each other, or some combination thereof. Embodiments of the tool facilitate associating prior art references with a matter and automatically associating the references with other matters within the clan and/or within other clans with which the matter is associated. Additionally, embodiments of the tool facilitate automatically generating Information Disclosure Statement (IDS) filing packages (e.g., completed IDS forms and copies of cited references), allowing for review of the completed IDS forms and cited references, and providing various types of notifications to users.

FIG. 1 depicts an illustrative operating environment 100. As shown, the illustrative operating environment 100 includes an interaction server 110 that communicates with a web server 112, which presents information via a browser 114 that may be hosted by a computing device such as, for example, a workstation, a laptop, a desktop, or the like. The interaction server 110 includes a number of services 118 and is communicatively coupled to a database 116. The interaction server 110 can also communicate, via a docket interface 130, with a docketing system 132. Also, as shown in FIG. 1, the interaction server 110 can communicate, via a data management (DM) interface 134, with a DM system 136, which can communicate with a database 138. In embodiments, the environment 100 can include other databases such as, for example, a database associated with the web server 112, a database associated with the docketing system 132, and the like. In embodiments, the docket interface 130 and the DM interface 134 can include any type of communication interface that can allow the interaction server to communicate with the docketing system 132 and the DM system 136, respectively, and are to be distinguished from graphical user interfaces (referred to herein as "interfaces"). For example, in embodiments, the interfaces 130 and 134 can be application programming interfaces (APIs).

The illustrative operating environment 100 shown in FIG. 1 is not intended to suggest any limitation as to the scope of use or functionality of embodiments of the inventions disclosed throughout this document. Neither should the illustrative operating environment 100 be interpreted as having any dependency or requirement related to any single component or combination of components illustrated therein. Additionally, any one or more of the components depicted in FIG. 1 can be, in embodiments, integrated with various ones of the other components depicted therein (and/or components not illustrated). Any number of other components or combinations of components can be integrated with the illustrative operating environment 100 depicted in FIG. 1, all of which are considered to be within the scope of the invention.

In embodiments, the interaction server 110 can be any type of server that resides on one or more computing devices. The interaction server 110 includes a number of services 118 that provide various functionalities for managing prior art references related to patent applications. A prior art reference (referred to herein as "reference") can include any type of information that is, or may be, considered prior art with respect to a patent application. Examples of references include United States ("U.S.") patents, U.S. patent applications, foreign (i.e., non-U.S.) patents, foreign patent applications, non-patent literature (e.g., articles, books, web pages, images, diagrams, speeches, etc.), and the like. According to embodiments, the interaction server 110 can include services such as identification services that handle user authentications and permissions; interface services that facilitate interaction with other systems such as, for example, docketing systems 132, DM systems 136, and the like; notification services that facilitate providing notifications to users; services that facilitate adding references to the database 116; services that facilitate generating completed IDS forms; services that facilitate generating IDS filing packages; services that facilitate management of clans (e.g., associating matters with clans, pushing references between clans, etc.); and any number of other types of services that can be used to facilitate embodiments of the various features and functionalities described herein.

The interaction server 110 communicates with a web server 112, which provides various application interfaces to a user via the browser 114. The web server 112 can be any type of web server that can interact with a browser to present an interface (e.g., graphical user interface) to a user and may implement, for example, a web services platform. An interface can include any type of suitable window, interaction region, dialog box, or the like. In embodiments, the web server 112 can interact with any number of different browsers 114 at any given time and can interact with browsers 114 over any number of different types of communication networks such as for example, a local area network (LAN), a wide area network (WAN), a combination of networks, or the like.

Additionally, the interaction server 110 communicates with the database 116. In embodiments, the database 116 can be any type of database suitable for storing information associated with references, matters, clans, and the like. For example, the database 116 can be a relational database, a table, a multidimensional data cube, a number of related databases, or the like. According to embodiments, the database 116 can store descriptive data related to references (e.g., metadata), references, links to references, information associated with clans (e.g., clan names, clan descriptions, etc.), associations between references and matters, associations between clans and matters, user permissions, historical information (e.g., information associated with IDSs that have been filed, actions performed by users, etc.), and the like. In some embodiments, information related to matters can be retrieved from the docketing system 132 and can be maintained in the docketing system 132. In other embodiments, such information can be replicated on the database 116. In embodiments, all of the different types of data described above can be maintained on a single database or set of databases.

In operation, a user can log in to the reference-management tool by using a web browser 114 to navigate to a web page hosted by the web server 112. Once logged in, the interaction server 110 can provide interfaces to the user via the web server 112. In embodiments, the type of interface and/or the features presented on the interface can be determined according to the user's permissions. Permissions can include any number of different types of static or dynamic data structures that associate a particular user with a set of authorizations. For example, in embodiments, users can be classified according to various roles such as administrator, legal assistant, filing specialist, attorney, and the like. In embodiments, any number of other roles in addition to, or in lieu of, these listed roles can be utilized. Each role can be assigned a set of permissions such that the experience (e.g., types of interfaces, appearance of interfaces, editing abilities, etc.) can be different for each role. In embodiments, a user may be assigned more than one role and/or may have other associated permissions in addition to, or in lieu of, permissions associated with the user's role.

As an example, in embodiments, a user that is assigned an administrator role may have full capabilities (e.g., ability to view all interfaces, to view all features of each interface, ability to perform all actions, etc.), while a user assigned an attorney role may have more limited permissions. For example, permissions associated with an attorney role may allow the user to receive notifications (e.g., when matters have been added or removed from a clan associated with the user, when references have been added or removed from a matter associated with the user, when an IDS has been generated for the user's review, when an IDS has been approved and is ready to file, when a patent status for a matter has changed from filed to granted, etc.) and may be able to view particular interfaces such as a report interface (e.g., for generating reports associated with clans, matters, references, etc.), a search interface (e.g., for searching for references within the database 116), a view matter interface (e.g., for reviewing references associated with a matter and previously-filed IDSs), and the like. Similarly, a legal assistant role may include permissions related to activities commonly performed by legal assistants (e.g., adding references, generating IDSs, etc.), but not activities commonly performed by attorneys (e.g., approving an IDS) and a filing specialist may have permissions associated with filing activities (e.g., receiving notifications of approved IDSs, downloading IDS filing packages, etc.).

FIGS. 2-11 depict illustrative graphical user interfaces ("interfaces") that can be presented to users in accordance with embodiments of the invention. Interfaces associated with embodiments of the invention are not intended to be limited to require the features, configurations, and appearances illustrated and described herein. Any number of different types of interfaces and/or features that facilitate various functionalities described herein are contemplated within the ambit of the invention.

Figure 2:
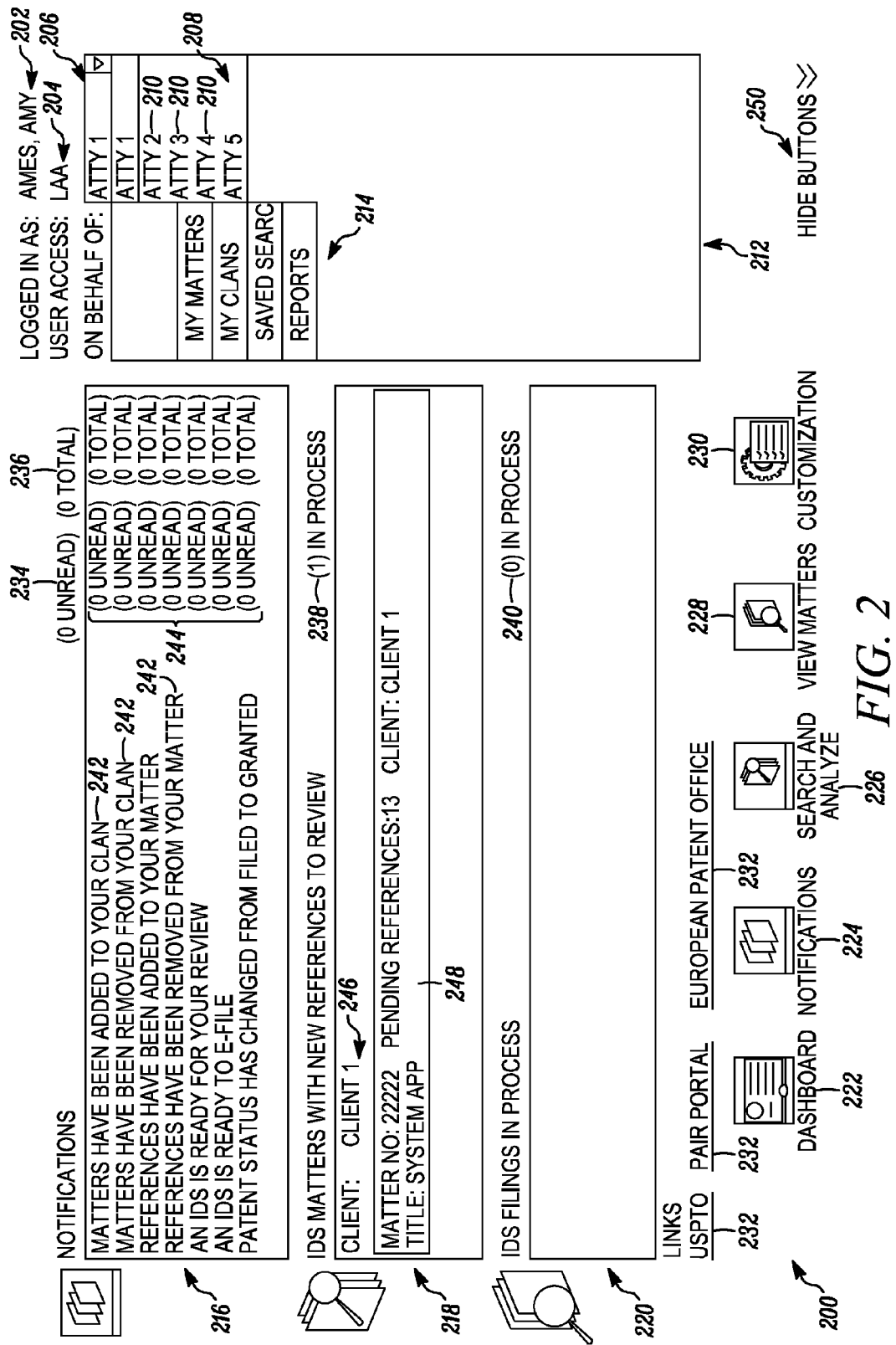
FIG. 2 depicts an illustrative dashboard interface in accordance with embodiments of the invention.
Figure 3:
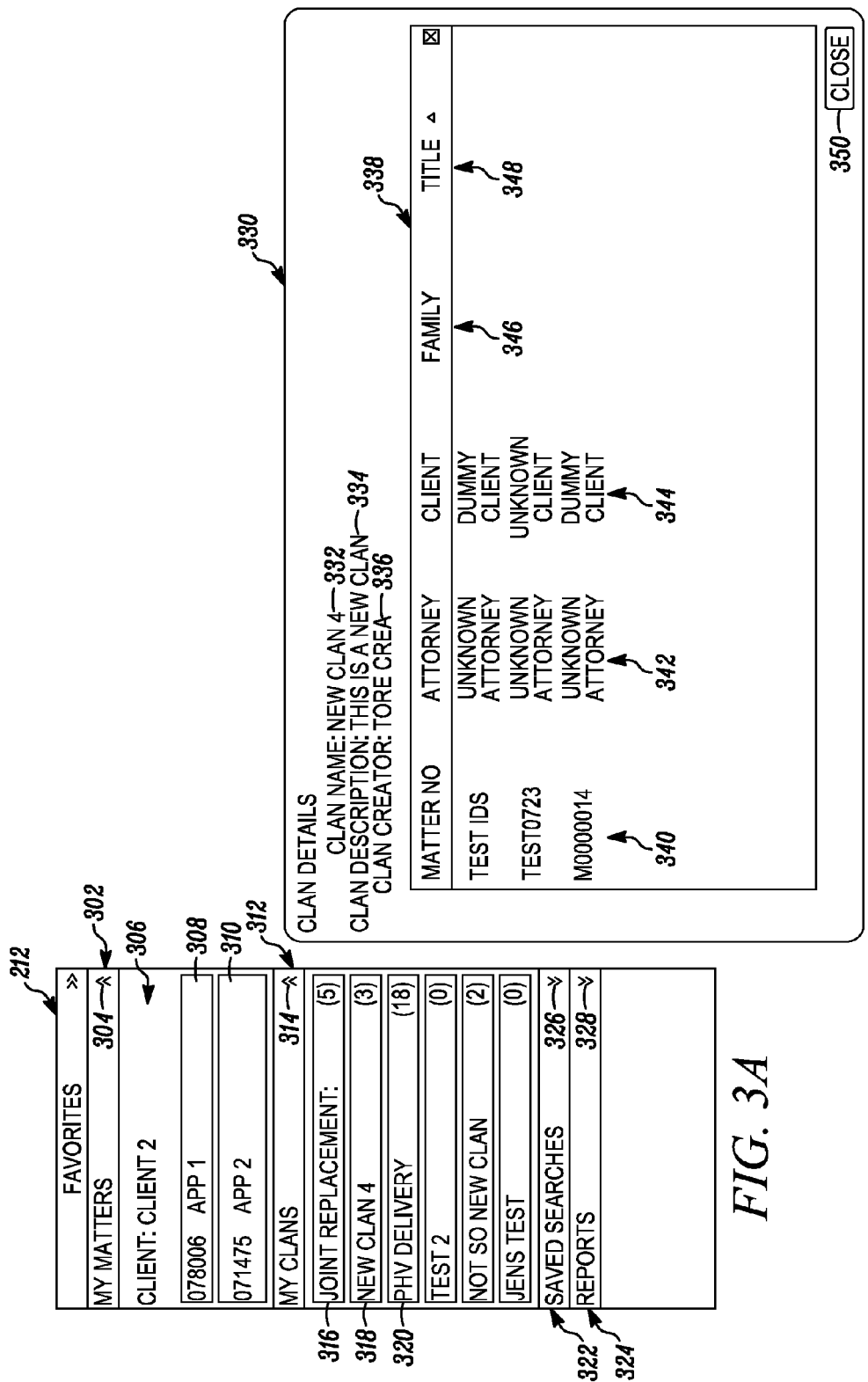
FIG. 3A depicts an illustrative navigation region in accordance with embodiments of the invention.
FIG. 3B depicts an illustrative clan details interface in accordance with embodiments of the invention.

FIG. 2 illustrates an example of a dashboard interface 200 in accordance with embodiments. The illustrative dashboard interface 200 can be used, in embodiments, as a primary interface that presents summary information related to matters and clans with which the logged-in user works and from which the user can navigate to any number of other functional interfaces. The dashboard interface 200 can be presented to a user when the user logs on, upon navigating to the dashboard interface 200, or in response to any other number of different types of events.

As shown in FIG. 2, the illustrative dashboard interface 200 includes a user indicator 202 that identifies the user that is logged in to the tool, a role indicator 204 that indicates the role (e.g., corresponding to various permissions) assigned to the logged-in user, and a supervisor indicator 206 that identifies the individual on whose behalf the user is logged in. For example, in embodiments, a user, e.g., "Amy Ames," may log in to the tool to perform tasks on behalf of another user, e.g., "ATTY 1." In embodiments, for instance, a first user (e.g., Amy Ames) may be an assistant (e.g., a legal assistant, a secretary, a paralegal, or the like, that assists an attorney, agent, or other type of user) to the second user (e.g., ATTY 1). In the illustrated embodiment, Amy Ames is a legal administrative assistant ("LAA") and is logged in to the tool to perform tasks on behalf of an attorney, ATTY 1, as demonstrated by the indicators 202, 204, and 206. The supervisor indicator 206 can include a drop-down list 208 that allows the logged-in user to select, from a list 210 of users, the user on whose behalf the logged-in user is working. In embodiments, the supervisor indicator 206 can include other types of selection mechanisms such as text search boxes, pop-up windows, browsing windows, or the like.

The illustrative dashboard interface 200 includes a navigation region 212, in which are presented a number of options 214 for viewing, or navigating to, various types of information. For example, the options 214 can include "favorites" options that can allow a user to navigate to frequently-used interfaces. The illustrative "favorites" navigation region 212 is depicted in more detail in FIG. 3A.

As shown in FIG. 3A, the navigation region 212 includes a number of indicators for various categories of information. In embodiments, the navigation region 212 can include any number of other indicators in addition to, or in lieu of, the indicators depicted in FIG. 3A. The navigation region 212 includes a "MY MATTERS" indicator 302 that includes an expander 304 that, when selected, causes additional information to be presented. In embodiments, for example, selecting the expander 304 can cause a listing of matters to which the logged-in user has subscribed to be presented. In the illustrated embodiment, the listing of matters is organized by clients and includes a client indicator 306 that can reflect the name of the client, a client number, or the like. Two matter indicators 308 and 310 are organized under the client indicator 306 and include representations of particular matters associated with the client. In embodiments, the matter indicators can be selectable such that selection of a matter indicator 308 or 310 can cause an interface to be presented to the user that includes information specific to the selected matter such as, for example, a view matter interface (e.g., the view matter interface 800, depicted in FIG. 8 and described below).

As shown in FIG. 3A, the illustrative navigation region 212 also includes a "MY CLANS" indicator 312 that includes an expander 314 that, when selected, causes additional information to be presented. For example, as illustrated, selection of the expander 314 can cause a listing of clans to which the logged-in user is assigned to be presented. In the illustrated embodiment, the listing of clans includes, for example, a number of clan indicators 316, 318, and 320 that each includes the name of the respective clan and a numeral indicating the number of matters that are associated with the clan. In embodiments, the clan indicators can be selectable such that selection of a clan indicator 316, 318, or 320 can cause an interface to be presented to the user that includes information specific to the selected clan such as, for example, a clan details interface 330, as shown in FIG. 3B.

The clan details interface 330 includes a clan name indicator 332, a clan description indicator 334, a clan creator indicator 336, and a detail region 338. As shown in FIG. 3B, the detail region 338 includes a listing of the matters associated with the clan. Each matter is represented by a matter number indicator 340, which indicates the character string used to designate a particular matter; an attorney indicator 342, which indicates the identity of one or more attorneys assigned to the matter; a client indicator 344, which indicates the client associated with the matter; a family indicator 346, which indicates an identifier associated with a family to which the matter belongs; and a title indicator 348, which indicates the title of the matter. In embodiments, the clan details interface 330 can be presented, for example, as a pop-up window and can be closed by selecting a close option 350.

As is further illustrated in FIG. 3A, the navigation region 212 includes a "SAVED SEARCHES" indicator 322, that includes an expander 326 that, when selected, causes additional information to be presented. For example, selection of the expander 326 can cause a listing of searches (e.g., identified by search indicators) that have been saved by the user to be presented. In embodiments, the search indicators can be selectable such that selection of a search indicator can cause an interface to be presented to the user that includes information specific to the selected search. For example, in embodiments, selection of a search indicator can cause the associated search to be re-run, a search interface to be presented, or the like. The navigation region 212 includes a "REPORTS" indicator 324, that includes an expander 328 that, when selected, causes additional information to be presented. For example, selection of the expander 328 can cause a listing of reports (e.g., identified by report indicators) that have been saved by the user to be presented. In embodiments, the report indicators can be selectable such that selection of a report indicator can cause an interface to be presented to the user that includes information specific to the selected report. For example, in embodiments, selection of a report indicator can cause the associated report to be re-run, a report-generation interface to be presented, or the like. According to embodiments, reports can include any type of summary, aggregation, illustration, or other representation of information.

As shown in FIG. 2, the illustrative dashboard interface 200 also includes a first region 216 for displaying notifications, a second region 218 for displaying representations of matters having pending references, and a third region 220 for displaying representations of matters for which IDS filing packages have generated and are ready for review. In embodiments, the dashboard interface 200 can include any number of other regions in addition to, or in lieu of, the regions 216, 218, and 220 depicted in FIG. 2. The illustrative dashboard interface 200 also includes a number of buttons, or other types of selectable representations, that can facilitate navigation to other interfaces. For example, the illustrative dashboard interface 200 includes a "DASHBOARD" button 222 that can be activated to cause presentation of a dashboard interface 200, a "NOTIFICATIONS" button 224 that can be activated to cause presentation of a notifications interface (e.g., the notifications interface 1100 depicted in FIG. 11), a "SEARCH AND ANALYZE" button 226 that can be activated to cause presentation of a search interface (e.g., the search interface 700 depicted in FIG. 7), a "VIEW MATTERS" button 228 that can be activated to cause presentation of a view matter interface (e.g., the view matter interface 800 depicted in FIG. 8), and a "CUSTOMIZATION" button 230 that can be activated to cause presentation of a customization interface (e.g., the customization interface 400 depicted in FIG. 4). The illustrated dashboard interface 200 also includes a number of hyperlinks 232 that can be used to navigate to web pages external to the application such as, for example, the United States Patent & Trademark Office (USPTO), the Patent Application Information Retrieval (PAIR) portal, the European Patent Office, or the like. The dashboard interface 200 also includes a "HIDE BUTTONS" option 250 that, when selected, can cause the buttons 222, 224, 226, 228, and 230 to be removed (e.g., hidden) from the interface 200. Any number of other buttons, links, or the like can be included in addition to, or in lieu of, the illustrated buttons and links. Additionally, according to embodiments of the invention, any number of different interfaces associated with the tool can include information, buttons, links, and the like, as depicted in the illustrative dashboard interface 200.

In embodiments, each of the regions 216, 218, and 220 can include a summary indicator that represents a summary of information relevant to the particular region. For example, the first region 216 includes a first summary indicator 234 that indicates the number of unread notifications associated with the logged-in user and a second summary indicator 236 that includes the total number of notifications (i.e., combination of read and unread notifications). The region 216 can include representations 242 of various categories of notifications and summary indicators 244 that indicate, for example, the number of unread and total notifications corresponding to each of the category representations 242.

The second region 218 includes a summary indicator 238 that indicates the number of matters having pending references (e.g., references that should be reviewed by an attorney to determine whether the references should remain associated with the matter, disclosed in an IDS, etc.). The second region 218 depicted in FIG. 2 includes a representation 248 of a matter having references pending. A client indicator 246 indicates the client corresponding to the matter. In embodiments, a number of different matters can be represented in the second region 218 and may, for example, be organized (e.g., sorted) according to corresponding clients. Other sorting/organization schemes can be used as well. As shown, the representation 248 of the matter includes information associated with the matter such as, for example, a matter number, the matter title (e.g., patent application title), the name of the client, the number of references that are pending, or the like. In embodiments, the representation 248 of the matter can include any type of representation that serves as an indication of the particular matter.

Similarly, the third region 220 includes a summary indicator 240 that indicates the number of matters having IDS filing packages that have been generated and are ready for review. In embodiments, if a user has caused the interaction server 110 to generate an IDS filing package, a notification may be automatically presented in the third region 220. In embodiments, the notification can include an indication of a matter having an associated completed information disclosure statement (IDS) form to be reviewed. Additionally, in embodiments, the notification can be selectable such that selection of the notification can cause an interface to be presented such as, for example, an IDS review interface that allows a user to review the IDS filing package (e.g., IDS review interface 1120, depicted in FIG. 11). Notifications presented in the third region 220 can include any number of different types of information regarding IDS filing packages that have been generated such as, for example, representations, selectable items, and the like.

Figure 4:
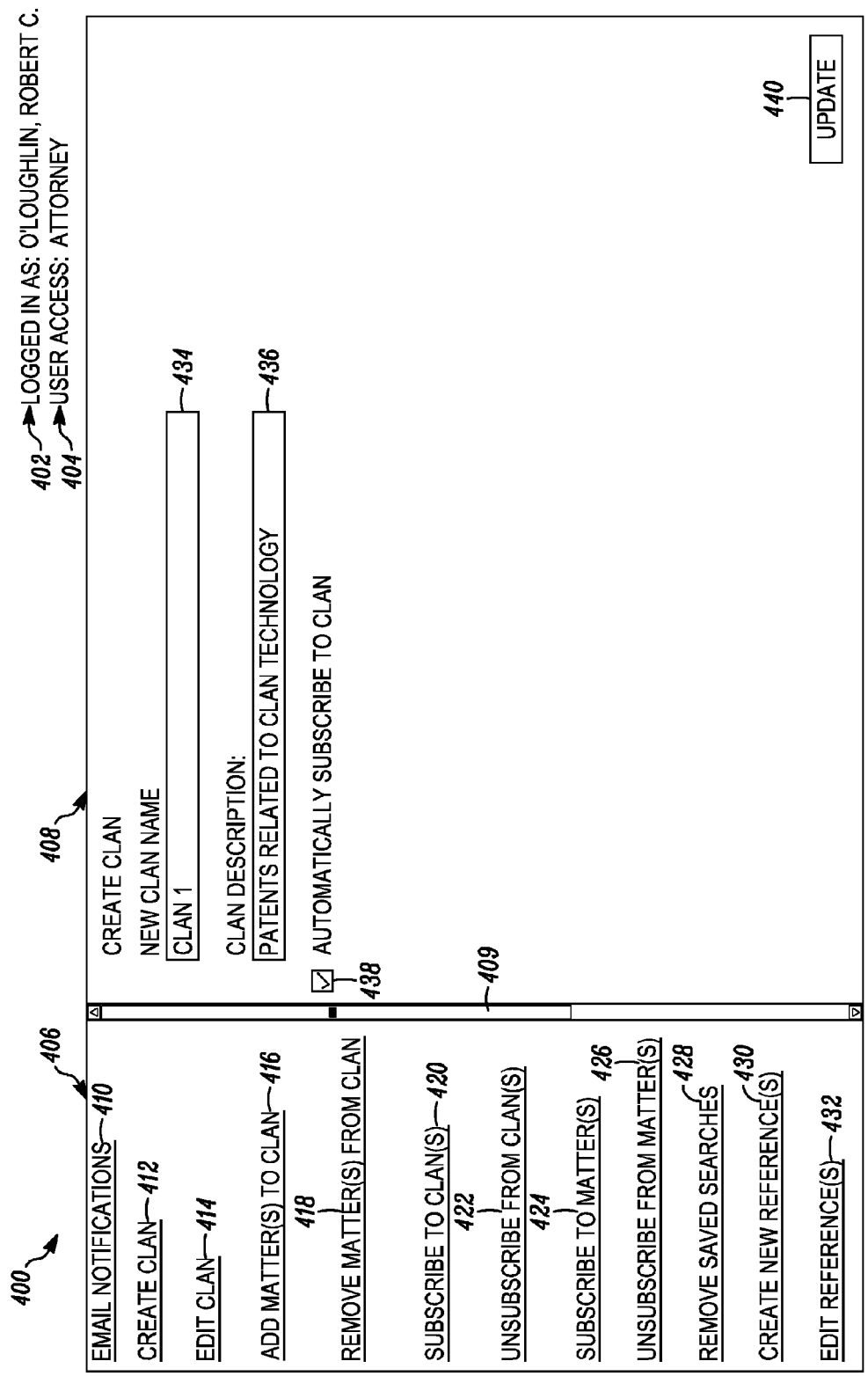
FIG. 4 depicts an illustrative customization interface in accordance with embodiments of the invention.

FIG. 4 depicts an illustrative customization interface 400 that can be used to facilitate any number of tasks associated with the logged-in user's experience, clan management, matter management, reference management, and the like. The customization interface 400 includes a user indicator 402 that identifies the logged-in user and a supervisor indicator 404 that identifies the user on whose behalf the logged-in user is working. The customization interface 400 includes a navigation region 406 and an interaction region 408. The navigation region 406 includes a listing of selectable options and, if the listing includes more options than can be displayed at a single time on the interface 400, can include a scroll bar 409 or other navigational tool allowing for presentation of additional options. In the illustrated embodiments, the navigation region 406 includes selectable options for presenting interaction regions that facilitate performing various tasks, including, "EMAIL NOTIFICATIONS" 410, "CREATE CLAN" 412, "EDIT CLAN" 414, "ADD MATTER(S) TO CLAN" 416, "REMOVE MATTER(S) FROM CLAN" 418, "SUBSCRIBE TO CLAN(S)" 420, "UNSUBSCRIBE FROM CLAN(S)" 422, "SUBSCRIBE TO MATTER(S)" 424, "UNSUBSCRIBE FROM MATTER(S)" 426, "REMOVE SAVED SEARCHES" 428, "CREATE NEW REFERENCE(S)" 430, and "EDIT REFERENCE(S)" 432. In embodiments, any number of additional or different options can be presented in the navigation region 406. Also, in embodiments, the navigation region 406 can be represented by a drop-down window, a task-bar item, a pop-up window, a selectable menu, or the like.

As shown in FIG. 4, a user can select, for example, the "CREATE CLAN" option 412 to display a create clan interaction region 408. The create clan interaction region 408 includes a number of data entry fields such as a "NEW CLAN NAME" field 434 and a "CLAN DESCRIPTION" field 436. A new clan may be manually created and the user can enter a name (e.g., of the user's choice) for the new clan in the "NEW CLAN NAME" field 434. The user may further enter a description corresponding to the new clan in the "CLAN DESCRIPTION" field 436. In embodiments, the interaction region 408 includes an "AUTOMATICALLY SUBSCRIBE TO CLAN" option 438 such as, for example, a checkbox, radio button, or the like, that allows the user to automatically subscribe to the new clan. In embodiments, the interaction server provides notifications of changes associated with a clan, matters within the clan, references associated with the clan, and the like, to users that have subscribed to the clan. Additionally, in embodiments, subscribing to a clan may cause an indication of the clan to be presented in a favorites menu, navigation region, or the like.

Although not illustrated, for the purposes of brevity of description, various other interfaces that facilitate performance of various tasks can be accessed using the navigation region 406. For example, a user may select the "EDIT CLAN" option 414 to edit information relating to a clan, such as to rename the clan, to change the clan description, and the like. Once the information relating to the clan is manually edited, the user my update the changed information into a database. A user may select the "ADD MATTER(S) TO CLAN" option 416 to access an interface through which the user can associate matters with a particular clan or clans. A user may select the "REMOVE MATTER(S) FROM CLAN" option 418 to access an interface through which the user can remove (disassociate) matters from a particular clan or clans. A user may select the "SUBSCRIBE TO CLAN(S)" option 420 to access an interface through which the user can subscribe to clans so that, when changes are made with reference to a clan (e.g., matters are added or removed, references are added or removed from associated matters, IDSs are generated or filed, etc.), the user will receive notifications of the changes (e.g., through a dashboard interface 200, email, messaging system, etc.). A user may select the "UNSUBSCRIBE FROM CLAN(S)" option 422 to access an interface through which the user can unsubscribe from clans and thereby not continue to receive notices of changes associated with the unsubscribed clans. A user may select the "SUBSCRIBE TO MATTER(S)" option 424 to access an interface through which the user can subscribe to particular matters, facilitating similar experiences as described above with reference to subscribing to clans and, similarly, a user may select the "UNSUBSCRIBE FROM MATTER(S)" option 426 to unsubscribe from matters. A user may select the "REMOVE SAVED SEARCHES" option 428 to access an interface through which the user can select saved searches to be removed from the user's account, which, in embodiments, may remove the indications of the saved searches from a favorites menu, navigation region, or the like.

Additionally, as shown in FIG. 4, the customization interface 400 includes a "CREATE NEW REFERENCE(S)" option 430 that, when selected by a user, causes a user to be presented with an add references interface such as, for example, the add references interface 500 depicted in FIG. 5 and described below. Additionally, a user may edit descriptive information corresponding to references by selecting the "EDIT REFERENCE(S)" option 432. Any number of other options for customizing the user's experience can be included in addition to, or in lieu of, the options depicted in FIG. 4. For example, in embodiments, the customization interface 400 can include a "CITED BY EXAMINER" option that, when selected, facilitates entry of information associated with a reference that was cited by an examiner in an office action or other office communication (e.g., a letter, an examiner interview, or the like).

Figure 5:
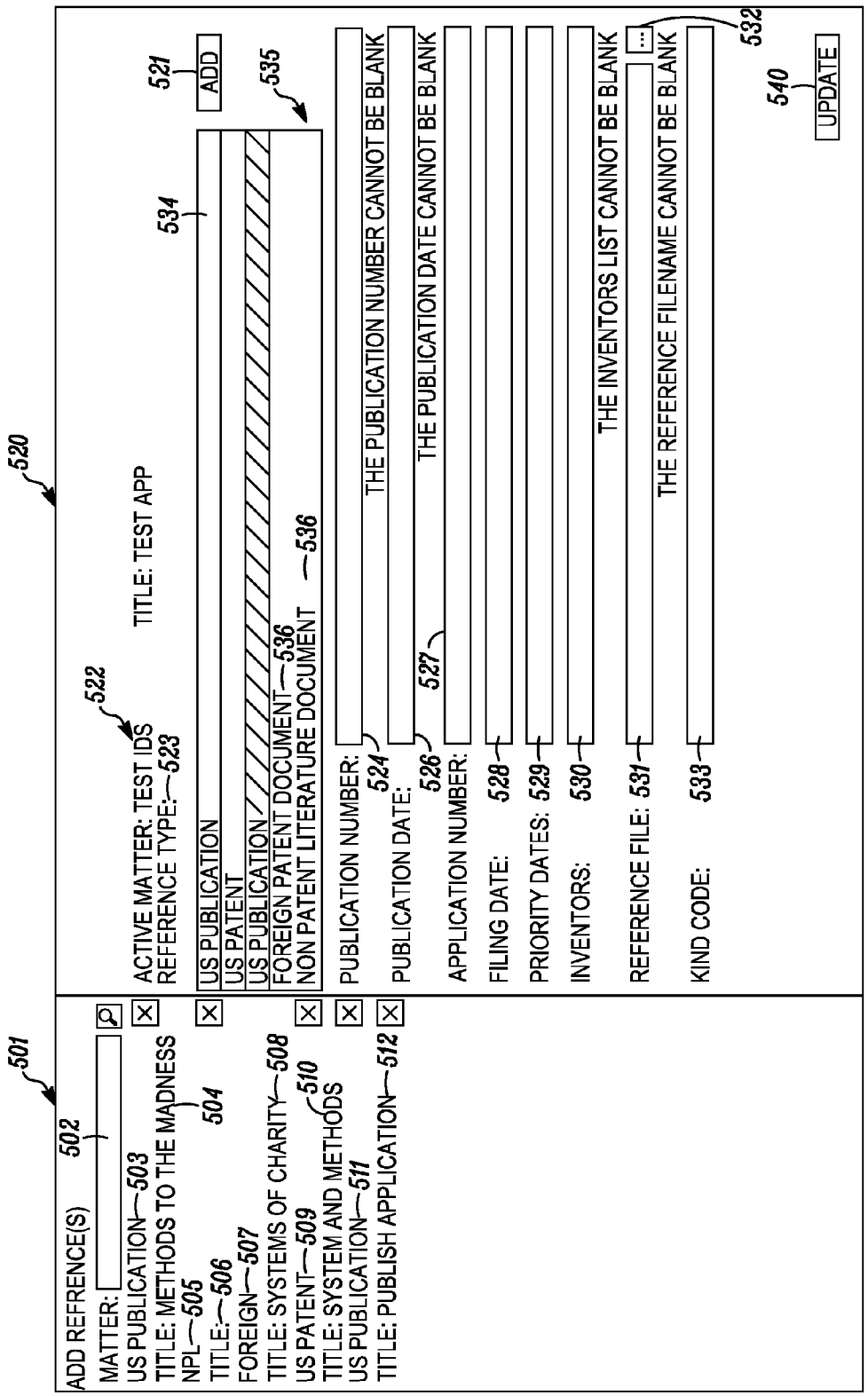
FIG. 5 depicts an illustrative add references interface in accordance with embodiments of the invention.

FIG. 5 depicts an illustrative add references interface 500 for adding new references to a database (e.g., database 116 depicted in FIG. 1). As shown in FIG. 5, the add references interface 500 includes a summary region 501 that provides summary information corresponding to new references that have been added or are in the process of being added. The summary region 501 can include any number of different types of summary information such as, for example, a matter indicator 502 that identifies a matter associated with the new reference, a reference-type indicator 503 that indicates the type of reference (e.g., "U.S. Patent," "U.S. Publication," "Foreign Patent," "NPL" (non-patent literature), and the like), the a title indicator 504 that indicates the title of the reference, and the like. The illustrated summary region 501 includes, for each new reference, a reference-type indicator 503, 505, 507, 509, and 511 and a title indicator 504, 506, 508, 510, and 512. In embodiments, any other information can be displayed within the summary region 501 in addition to, or in lieu of, information depicted in FIG. 5.

The add references interface 500 also includes an interaction region 520. As illustrated in FIG. 5, the interaction region 520 includes an "ADD" button 521 for refreshing the interaction region 520 so that a new reference can be added, a matter indicator 522 that indicates the matter to which the new reference is to be associated, a reference-type indicator 523, and a number of input fields 524, 526, 527, 528, 529, 530, 531, and 533 for receiving descriptive data corresponding to the reference. In embodiments, the matter indicator 522 can include an input field that allows a user to input a matter with which a new reference is to be associated. The matter input field may include a drop-down menu or other listing of selectable options that allows the users to select a matter. In embodiments, as information is added to input fields in the interaction region 520, corresponding summary information can be automatically populated in the summary region 501. For instance, as a reference title is entered into a title field in the interaction region 520, the title may appear in the summary region 501 (e.g., character-by-character, upon completion of entry, and the like).

In embodiments, input fields can be mapped to database fields and, in embodiments, can vary based on the type of reference that is being added. Additionally, examples of data to be entered into input fields can be presented, input fields can be assigned various properties (e.g., required, conditional, optional), and the like. In embodiments, any number of different types of input fields can be used to receive descriptive data related to references. For example, in embodiments, an input field can be provided for receiving information about an origin of the reference. That is, a user adding a reference can include data describing how the reference was discovered or determined to be related to the matter. For example, a user may enter data indicating that the reference was cited by an examiner in an office action, was cited in an International Search Report, was cited in a foreign office action, was uncovered in a private prior art search, was submitted by an associated inventor, or the like. In embodiments, input fields can also be used to receive information regarding the relationship of a reference to a case. For example, in embodiments, a user may input data indicating whether a reference was cited in a rejection in an office action, the type of rejection in which the reference was cited, and the like. Additionally, in embodiments, descriptive data can be entered automatically from a reference such as by utilizing output from a document parser, a document management system, and the like.

In embodiments, the reference-type indicator 523 can include an input field 534 for entering a particular reference type. In embodiments, as shown, for example, in FIG. 5, the input field 534 can include a drop-down menu 535 that includes a list of selectable options 536 (e.g., "US Patent," "US Publication," "Foreign Patent Document," and "Non-Patent Literature Document") from which a user can select the reference type corresponding to the reference to be added. Upon receiving a selection of a reference-type, the interaction region 520 can be dynamically configured (e.g., by a service 118 hosted by an interaction server 110, depicted in FIG. 1) to display input fields corresponding to descriptive data appropriate for the reference type. For example, if the "US Patent" reference type is selected, the input fields presented may include a field for the patent number, the issue date, and the like.

In the illustrated embodiment, the "US PUBLICATION" reference type has been selected and, in response, input fields corresponding to descriptive data appropriate for a published U.S. patent application are displayed, including a title field (not shown, as it is obscured by the drop-down menu 535), a publication number field 524, a publication date field 526, an application number field 527, a filing date field 528, a priority date field 529, an inventor field 530, and a kind code field 533. The illustrated add references interface 500 also includes a reference file field 531.

The reference filed field 531 can be used to input a location corresponding to the reference (e.g., an electronic copy of the reference). For example, if the reference being added is stored on a local drive, the address of the storage location (e.g., "c:/MyDocuments/Test IDS matter/references/Methods_to_ the_madness.pdf") can be entered in the "reference file" input field 531. Additionally, in embodiments, the reference file field 531 can be populated with an address corresponding to a location on a DM system, database, external website, or the like. In embodiments, the interaction region 520 includes a browse button 532 that can be selected to open a browsing window to facilitate locating the reference. References can be stored, for example, locally, on a shared database, in a document management (DM) system, or the like. By providing the address of the reference, the interaction server can use the address to access the reference for presenting the reference to a user, including the reference in an IDS filing package, or the like. In embodiments, various input fields of the interaction region 520 can be automatically populated by the interaction server upon determining, based on information entered into one or more of the other input fields, that the reference has already been entered into the system. In embodiments, information entered into key input fields (e.g., input fields that are associated with a key field in a database) can be checked against a database to determine whether a reference corresponding to the key value has already been entered. In embodiments, upon detecting that a reference has already been entered, an error message can be presented. After providing the appropriate descriptive data associated with the new reference, the user can select an "UPDATE" button 540 to submit the information to the interaction server, which stores the descriptive information and associates the reference with the identified matter.

Figure 6:
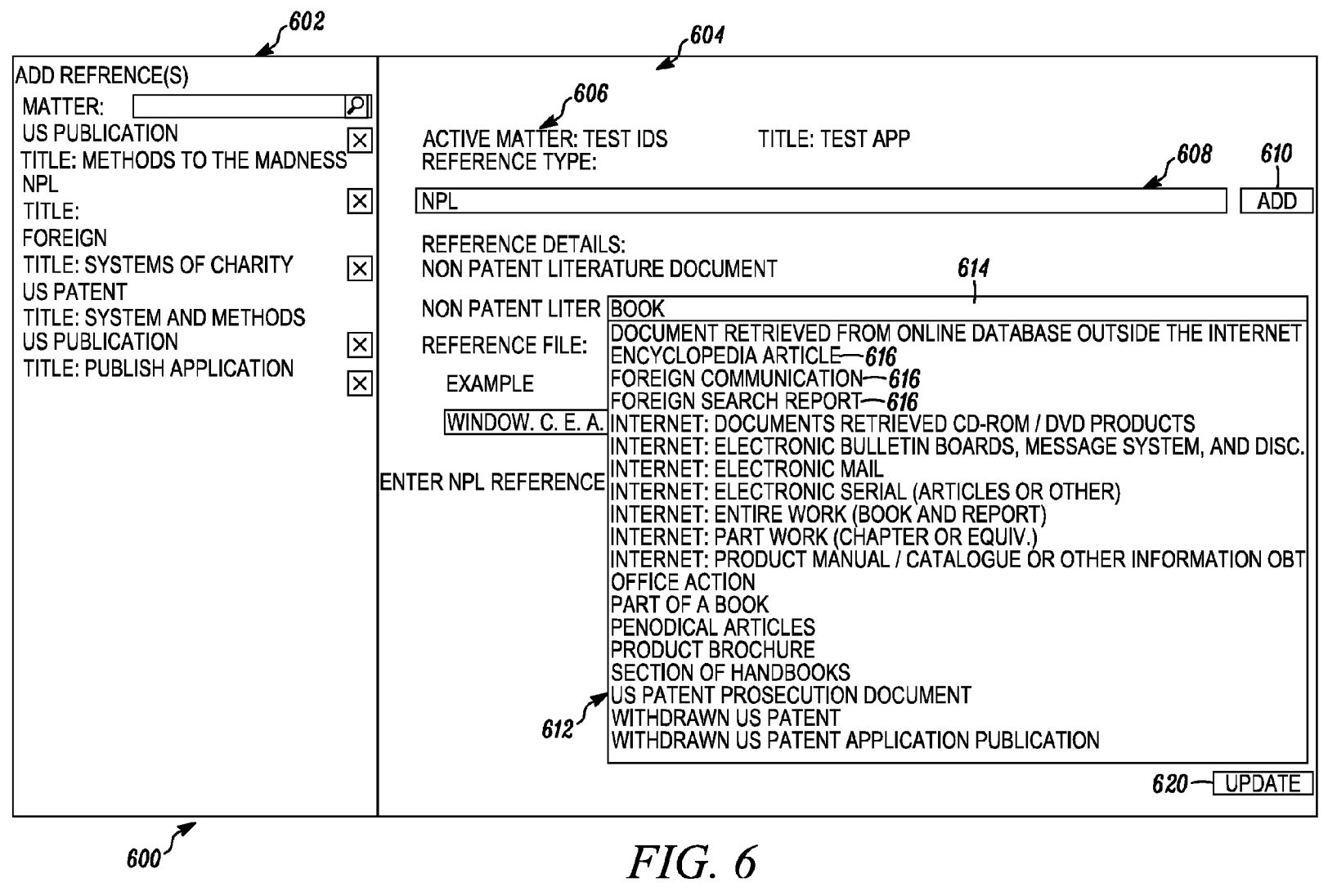

FIG. 6 depicts another illustrative add reference interface 600. The add reference interface 600 includes a summary region 602 and an interaction region 604. The interaction region 604 includes a matter indicator 606, a reference-type input field 608, an "ADD" button 610, and a number of input fields (e.g., input field 614). In the illustrated embodiment, the selected reference type corresponds to a non-patent literature ("NPL") document, as indicated in the reference-type input field 608 and a non-patent literature type input field 614 is presented to receive an input identifying the type of non-patent literature being added. For example, as shown in FIG. 6, a drop-down menu 612 presents a listing of selectable options 616 representing various types of non-patent literature (e.g., books, encyclopedias, internet documents, etc.) from which a user can select for populating the input field 614. The illustrated add references interface 600 also includes an "UPDATE" button 620 for submitting the added information to the interaction server. Of course, in embodiments, the interface 600 can include any number of different input fields, selectable options, and the like.

Figure 7:
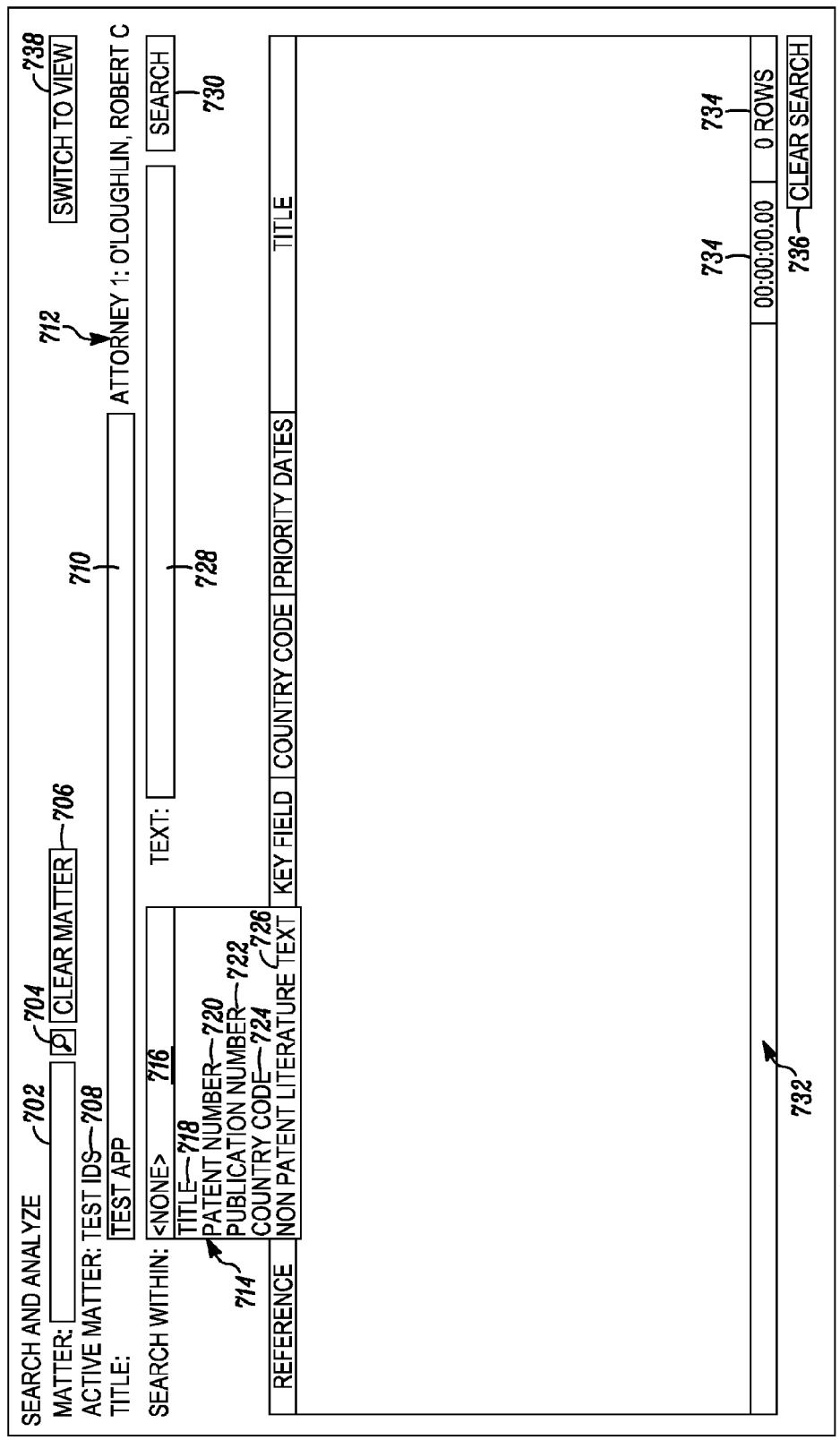
FIG. 7 depicts an illustrative search interface in accordance with embodiments of the invention.

In embodiments, each of the input fields in an add references interface may have a drop-down menu or other mechanism for listing selectable options that can allow a user to select the desired information to be added. Additionally, in embodiments, a user may add a reference to a matter by searching for the reference within the system, whereby if the reference is found, the user may not need to input descriptive data using an add references interface, but can simply command the interaction server to associate the found reference with a particular matter, matters, clan, clans, or the like. FIG. 7 depicts an illustrative search interface 700 for searching for matters, references, or the like. For example, a user may utilize the search interface 700 to search a references database for references to add to a matter. In embodiments, the search interface 700 provides the ability to search for references, save search criteria, export search results in various formats, and associate references from search results with a matter.

As shown in FIG. 7, the search interface 700 includes a matter input field 702 for receiving a matter identifier (e.g., a matter number), a search button 704 for initiating a search for a particular matter, a "CLEAR MATTER" button 706 for clearing the matter input field 702, a matter indicator 708, and an attorney indicator 712. In embodiments, a user can search for references by utilizing search text input fields 710 and 728. For example, a user can enter a matter number in the matter input field 702 to search for a reference that may already be associated with a matter. Additionally, the user may perform a search for a matter by activating the search button 704. In embodiments, activation of the search button 704 can cause a browsing window to be presented to the user, can automatically run a search based on a portion of a matter number entered into the matter input field 702, or the like. References can also be searched outside of the context of a particular matter by leaving the matter input field 702 blank.

To search for a reference, a user can enter a search parameter in the parameter field 716. A search parameter can include any type of location, context, or the like, associated with searching for a matter. In the illustrated embodiment, the parameter field 716 can have an associated drop-down menu 714 that presents a list of selectable options 718, 720, 722, 724, and 726 corresponding to various search parameters. For example, in FIG. 7, the selectable options include options for searching for keywords in a reference title (718), searching for matching numbers in a patent number corresponding to a reference (720), searching for matching numbers in a publication number corresponding to a reference (722), searching for references having a particular country code (724) and searching for keywords within the text of a non-patent literature reference (726). In embodiments, any number of different parameters can be presented for selection by a user. Additionally, the user may wish to search generally for matching information by leaving the parameter field 716 blank (or, in embodiments, selecting "NONE" as a parameter).

In embodiments, a search for a reference can be performed by entering information into any number of search text input fields such as, for example, a title field 710, a text field 728, or the like. Upon entering the desired search criteria, the user can activate a "SEARCH" button 730 to initiate the search. Search results can be displayed in a results region 732. If the search fails to yield any results, a notification that no results were returned can be displayed in the results region 732. The results region 732 can, in embodiments, include summary information 734 regarding the results obtained, the duration of the search session, or any other information associated with the search. Upon receiving a set of search results, the user can select a displayed result to cause information about the reference to be presented. In embodiments, the presented information can include a selectable representation of the reference such that selection of the representation causes the reference itself to be presented to the user (e.g., in PDF format). Embodiments of the search interface 700 include a "CLEAR SEARCH" button 736 for clearing the search text input fields 710 and 728, and/or the search results from the results region 732, so that a new search can be performed. Additionally, the search interface 700 can include functionality for associating a reference (e.g., returned in a set of search results) with a particular matter, clan, or the like.

Figure 8:
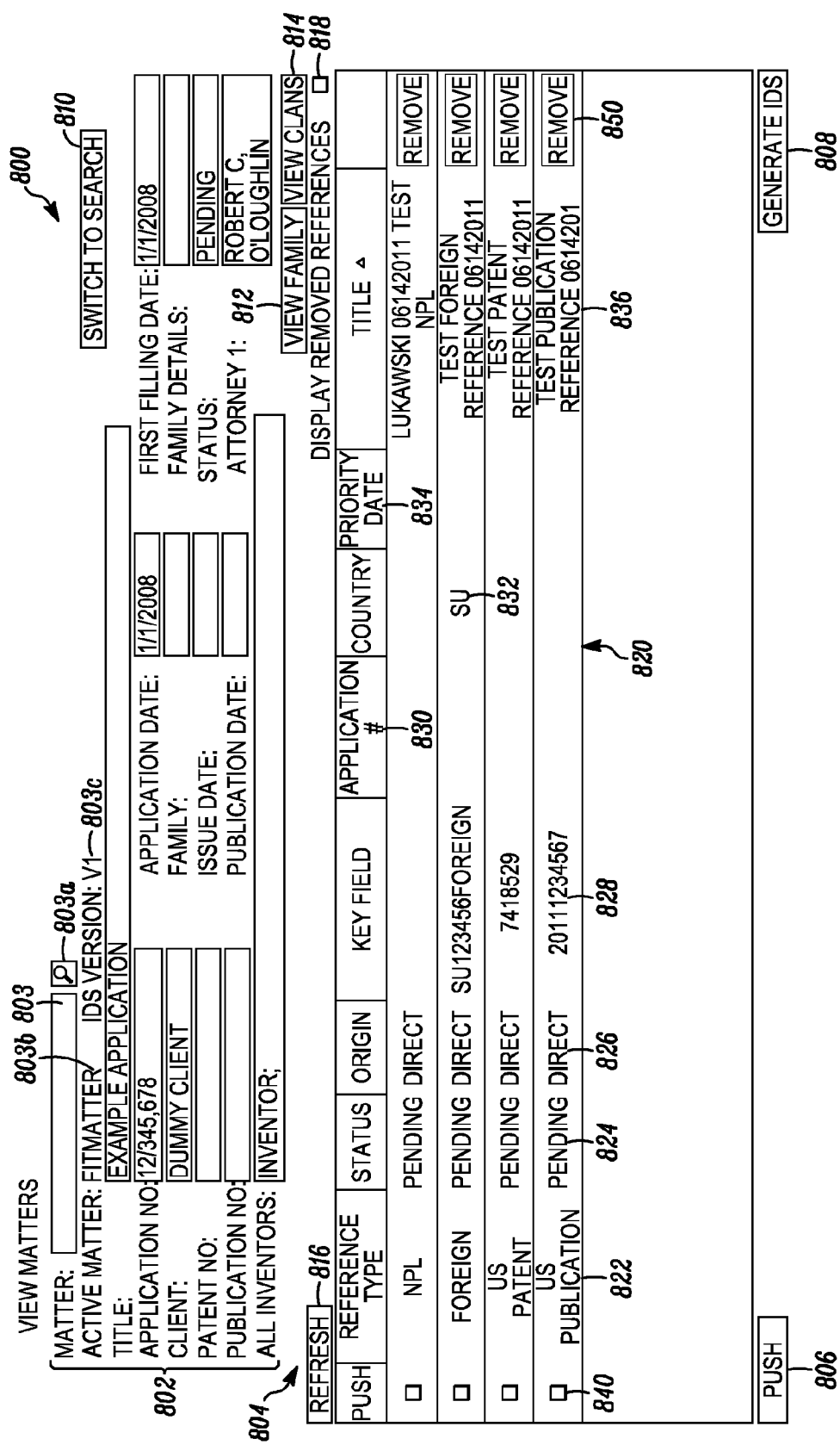
FIG. 8 depicts an illustrative view matter interface in accordance with embodiments of the invention.

FIG. 8 illustrates an example of a view matter interface 800. In embodiments, the view matter interface 800 displays pending references associated with a particular matter and, in embodiments, can display any number of other types of information as well. In embodiments, functionalities of the view matter interface 800 allow a user to review references associated with a matter, cause the interaction server to generate IDS filing packages, "push" references to other matters (e.g., cause references associated with a first matter to be associated with additional matters), remove (e.g., disassociate) references from a matter, and the like.

As shown in FIG. 8, the illustrated view matter interface 800 includes a matter-description region 802 and a reference region 804. The matter-description region 802 includes a number of informational fields that present information associated with the particular matter of interest. In embodiments, a matter can be selected by entering the matter number in a matter input field 803, or by searching for a matter using a search button 803a, which may be similar to search buttons described above with reference to other interfaces. In embodiments, upon selection of a particular matter, the selected matter (e.g., "active matter") can be indicated by an active-matter indicator 803b and various information fields within the matter-description region 802 can be automatically populated by the interaction server. In embodiments, the interaction server may retrieve the information from a database (e.g., database 116), from a docketing system (e.g., docketing system 132), or the like.

Additionally, as shown in FIG. 8, the view matter interface 800 includes an IDS-version indicator 803c, which indicates which version of an IDS is currently being constructed. For example, in embodiments, if the IDS-version indicator 803c indicates "v1," then there has not been an IDS filing package filed with respect to the active matter and, thus, the next IDS filing package that is generated will be the first IDS filing package for the matter and will be designated as "v1." On the other hand, if the IDS-version indicator 803c indicates "v2," for example, there has been one IDS filing package filed previously with respect to the active matter (e.g., IDS "v1") and the next IDS filing package to be generated will be designated as "v2." This functionality not only provides the user with information regarding whether IDS filing packages have been filed in the past (and how many), but also provides a labeling convention so that the user can access previous IDSs associated with the active matter by utilizing a history function associated with the tool. Additionally, corresponding database attributes can be used by the interaction server to ensure that, when the interaction server generates an IDS filing package (e.g., creates a completed IDS form and gathers cited references), the interaction server will not cite references that have already been included in a previously-filed IDS filing package.

The illustrative view matter interface 800 also includes a "PUSH" button 806 that facilitates "pushing" references to other matters (e.g., causing a selected reference to be associated with additional matters within the clan); a "GENERATE IDS" button 808 that, when activated, causes a generate command to be communicated to the interaction server for generating an IDS filing package; a "SWITCH TO SEARCH" button 810 that, when activated, causes a search interface (e.g., search interface 700 depicted in FIG. 7) to be presented; a "VIEW FAMILY" button 812 that, when activated, causes information associated with a family corresponding to the selected matter to be presented; a "VIEW CLANS" button 814 that, when activated, causes presentation of a listing of clans with which the selected matter is associated; a "REFRESH" button 816 that, when activated, causes the list of references in the reference region 804 to be refreshed (e.g., if multiple users are accessing the same matter at the same time and making changes regarding the references that are associated thereto, the "REFRESH" button 816 can be activated to refresh the interface so that the most current associations are presented); and a selectable option 818 for displaying removed references that, when selected, causes representations of references that have been removed from the selected matter (e.g., references that have been disassociated with the matter) to be displayed in the reference region 804.

The reference region 804 includes representations 820 of references that are associated with the matter. In embodiments, the representations 820 can be selectable such that selection of a representation causes the reference to be displayed to the user. In the illustrated embodiments, a representation 820 includes a reference-type indicator 822, a status indicator 824, an origin indicator 826, a key field 828, an application number indicator 830, a country indicator 832, a priority date indicator 834, and a title indicator 836. In embodiments, the status indicator 824 indicates the status of the reference with respect to the selected matter (e.g., pending, filed, removed, etc.). In embodiments, the origin indicator 826 indicates the origin of the reference with respect to the matter. In embodiments, the origin of a reference refers to the manner in which the reference came to be associated with the matter. For example, the reference can be directly associated with a matter such as by adding the reference to the matter through an add references interface (see, e.g., FIGS. 5 and 6), in which case, the origin indicator 826 can indicate that the reference was directly associated with the matter (e.g., "DIRECT"). In addition, a reference can be indirectly associated with a matter by utilizing a "push" functionality (described below), in which case the origin indicator 826 can indicate that the reference was pushed (e.g., "PUSHED"). In embodiments, the origin indicator 826 can indicate the matter from which a reference was pushed, as well. According to embodiments, when an IDS filing package has been approved for filing, the references cited in the IDS form can be automatically pushed to each other matter associated with the clan. In that case, the origin indicator 826 can indicate that the reference was automatically associated by virtue of having been included in an approved IDS filing package for a matter in the same clan (e.g., "IDS"). In embodiments, the origin indicator 826 may indicate that a reference had been added to the matter as a result of having been cited by a patent examiner in an office action (e.g., "CITED"). Any other number of different types of originating information can be indicated by the origin indicator 826 in accordance with embodiments of the invention such as, for example, information indicating that the reference was cited in an international search report, a foreign office action, a reexamination request, or the like.

In embodiments, the key field 828 is used to display a key value associated with the reference. For example, in embodiments, the key value can be a key value used to uniquely identify the reference in a database. In the illustrated embodiment, the key value is a string of characters that identify the reference. For example the key value can be a patent number, publication number, document number, a hash, a randomly generated character string, or the like. In the illustrated embodiments, the application number indicator 830 is used to display the application number of the reference (if the reference is a patent application or granted patent); the country indicator 832 is used to indicate a country code associated with the reference (e.g., a code identifying the country in which the reference originated, was first published, was filed, etc.); the priority date indicator 834 is used to indicate the priority date associated with a reference that is a patent or published patent application; and the title indicator 836 is used to indicate the title of the reference. In embodiments, any number of different, or additional, data fields can be included within the representation 820 of a reference. In some embodiments, the data fields to be displayed are automatically selected based on the type of reference.

As introduced above, references can be "pushed" to other matters via a view matter interface. As shown in FIG. 8, in embodiments, each representation of a reference includes a selectable region (e.g., check-box) 840. To associate a reference with another matter, a user can select the reference by selecting (e.g., "checking") the selectable region 840 and then activating the "PUSH" button 806. In embodiments, activation of the "PUSH" button 806 causes each selected reference to be associated with each other matter within the same clan. In embodiments, the view matter interface 800 can include mechanisms for selecting particular matters with which to associate a "pushed" reference. Additionally, in embodiments, "pushing" a reference can cause the reference to be associated with all of the matters in all of the clans with which the current matter is associated. In embodiments, when a reference is associated with a matter (e.g., directly, as a result of being "pushed," automatically in response to having been included in an approved IDS for a matter in the same clan, or the like), users can be notified that the reference has been associated with the matter (e.g., is now "pending"). In embodiments, notifications can be presented to users through a dashboard interface 200, communicated through email, or the like.

Additionally, as introduced above, users can remove (disassociate) references from a matter via a view matter interface 800. To remove a reference, a user can activate a "REMOVE" button 850 corresponding to the representation of the reference. In embodiments, the view matter interface 800 may include a single "REMOVE" button 850 and the user can remove one or more references by selecting the references (e.g., by selecting a selectable region 840 associated with the references) and then activating the "REMOVE" button 850. In embodiments, activating the "REMOVE" button 850 causes the interaction server to receive a remove command, in response to which the interaction server disassociates the reference from the matter. In embodiments, when a reference is removed from a matter, the representation 820 of the reference will be removed from the reference region 804 unless the "DISPLAY REMOVED REFERENCES" option 818 is selected. Any number of mechanisms can be employed to differentiate removed references from associated references such as, for example, indicating the "removed" status in the status indicator 824 or displaying the representation of the removed reference in a different color, resolution, or the like.

Figure 9:
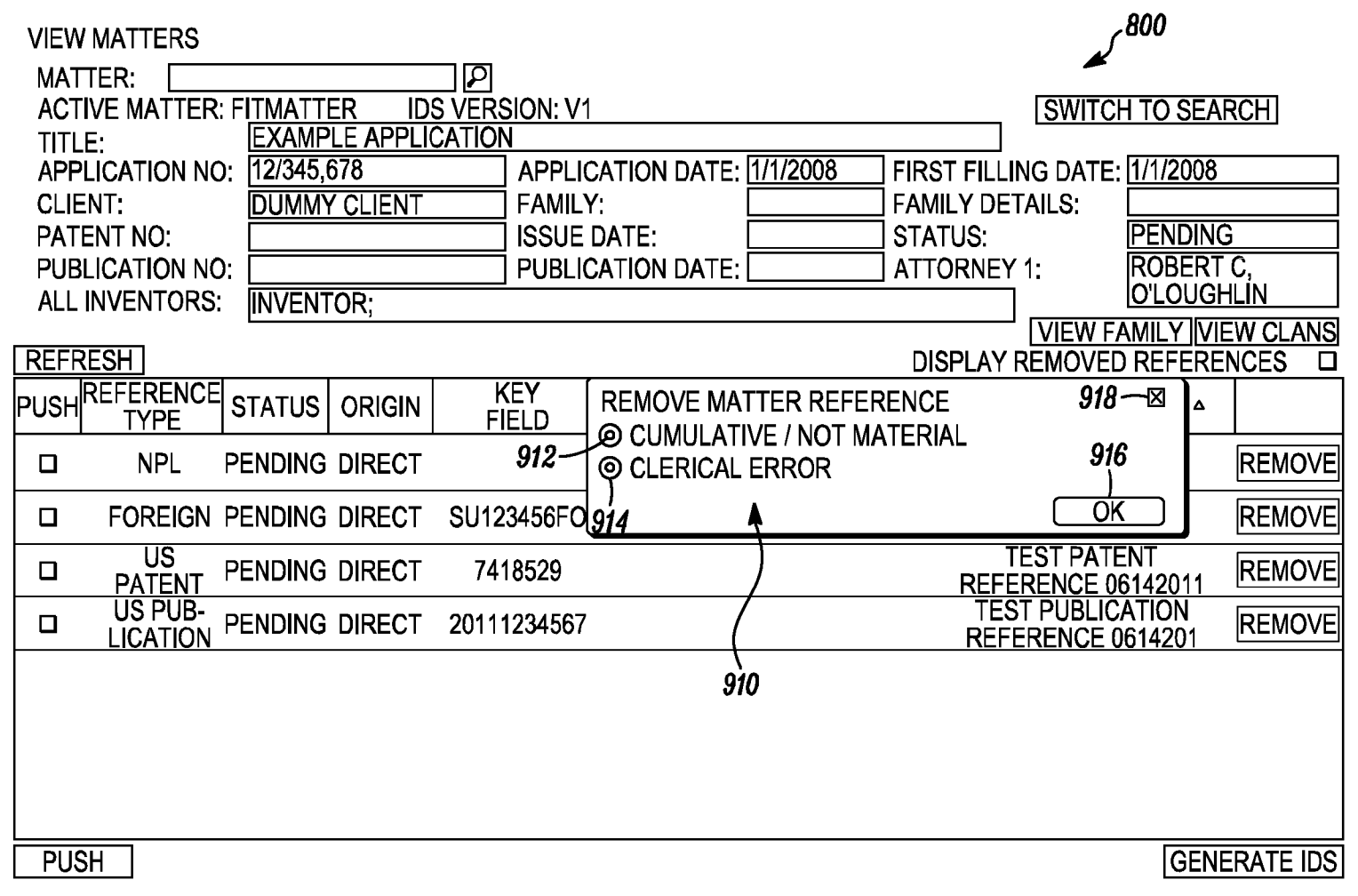

Because removing a reference from a matter may result in the removed reference not being included in an IDS filing package, it can be desirable to have a record of the reason for which a reference has been removed from a matter (and, thus, for example, a reason for why the reference was not disclosed to a particular patent office). Accordingly, in embodiments, when a user submits a remove command to the interaction server (e.g., by activating a "REMOVE" button 850), the user may be presented with a set of selectable options corresponding to reasons for removing the reference. FIG. 9 depicts an illustrative dialog box 910, displayed over a view matter interface 800, that includes selectable options corresponding to reasons for removing a reference. As shown in FIG. 9, the dialog box 910 includes a first radio button 912 corresponding to a first reason ("CUMULATIVE/NOT MATERIAL") and a second radio button 914 corresponding to a second reason ("CLERICAL ERROR"). In embodiments, any number of different, or additional, reasons can be included in the dialog box 910. Additionally, in embodiments, the options can be selectable hyperlinks, checkboxes, or any other mechanism for allowing a user to select between a number of reasons for removing a reference, for manually entering reasons or elaborations on selected reasons, or the like. In embodiments, the user can select one or more of the options. In other embodiments, the reasons can be presented as a part of the view matter interface 800, rather than in a separate dialog box 910. Additionally, embodiments include a mechanism for manually entering a reason (such as via an annotation to the reference), to allow for customized reasons to be associated with the removed references.

Utilizing the dialog box 910 depicted in FIG. 9, for example, the user may select one or more of the options 912 and 914 and activate the "OK" button 916. The interaction server can associate the selected reason or reasons with the removed matter (e.g., by associating an attribute with the reference in a database). If the user decides not to remove the selected reference, the user can simply close the dialog box 910 by activating the close button 918. Additionally, once a reference has been removed, it may be re-associated with the matter. For example, in embodiments, representations of removed references that are displayed in the reference region 804 can include an "ADD" button (not shown), the activation of which may cause the reference to be associated with the matter.

With continued reference to FIG. 8, a view matter interface 800 can also be used to generate an IDS filing package. A user can select a matter using the matter input field 803 and/or search button 803a. Upon selection of the matter, all of the pending references (e.g., references that are associated with the matter but have not yet been included in an approved IDS filing package) can be displayed in the reference region 804. In other embodiments, all of the references associated with a matter can be displayed and those that have not yet been included in an approved IDS filing package can be identified with an indication of that fact. For example, in embodiments, the status indicator 824 can reflect "PENDING," the representations 820 of pending references can be displayed differently than references that have been included in an approved IDS filing package, or the like. In embodiments, the tool can automatically determine which references do or do not need to be cited in a next IDS such as, for example, by determining (from information in the database) whether a reference has already been cited in a previous IDS, whether a reference has been cited in a parent application, whether a reference has been cited in a corresponding foreign application, or the like. In embodiments, the user can view individual references by selecting the corresponding representations and, when the user is satisfied that the list of pending references is complete, the user can activate the "GENERATE IDS" button 808. Activation of the "GENERATE IDS" button 808 causes a "generate" command to be communicated to the interaction server.

Upon receiving the "generate" command, the interaction server automatically populates input fields of an IDS form with descriptive data associated with each of the pending references to create a completed IDS form. The interaction server associates the completed IDS form with the cited references to create an IDS filing package. In embodiments, upon generating the IDS filing package, a confirmation message 1000 (illustrated in FIG. 10) can be provided to indicate that the IDS filing package has been generated. In embodiments, the confirmation message 1000 may include an "OK" button 1010 that a user can activate to confirm receipt of the confirmation message 1000. According to embodiments, upon generating the IDS filing package, the interaction server can notify various users (e.g., attorneys assigned to the matter, filing specialists, docketing personnel, etc.) that the IDS filing package has been generated and is ready for review (e.g., by a responsible attorney). For example, as depicted in FIG. 2, such a notification may appear as a notification or as an "IDS FILING IN PROCESS." In embodiments, upon generating the IDS filing package, the appearance of the view matter interface 800 can change and/or the functionalities of the interface 800 can be partially or completely locked until the IDS filing package is either approved or denied. For example, in embodiments, the view matter interface may be grayed out and a red notification may be displayed to indicate that the matter has an IDS filing package pending.

Figure 11:
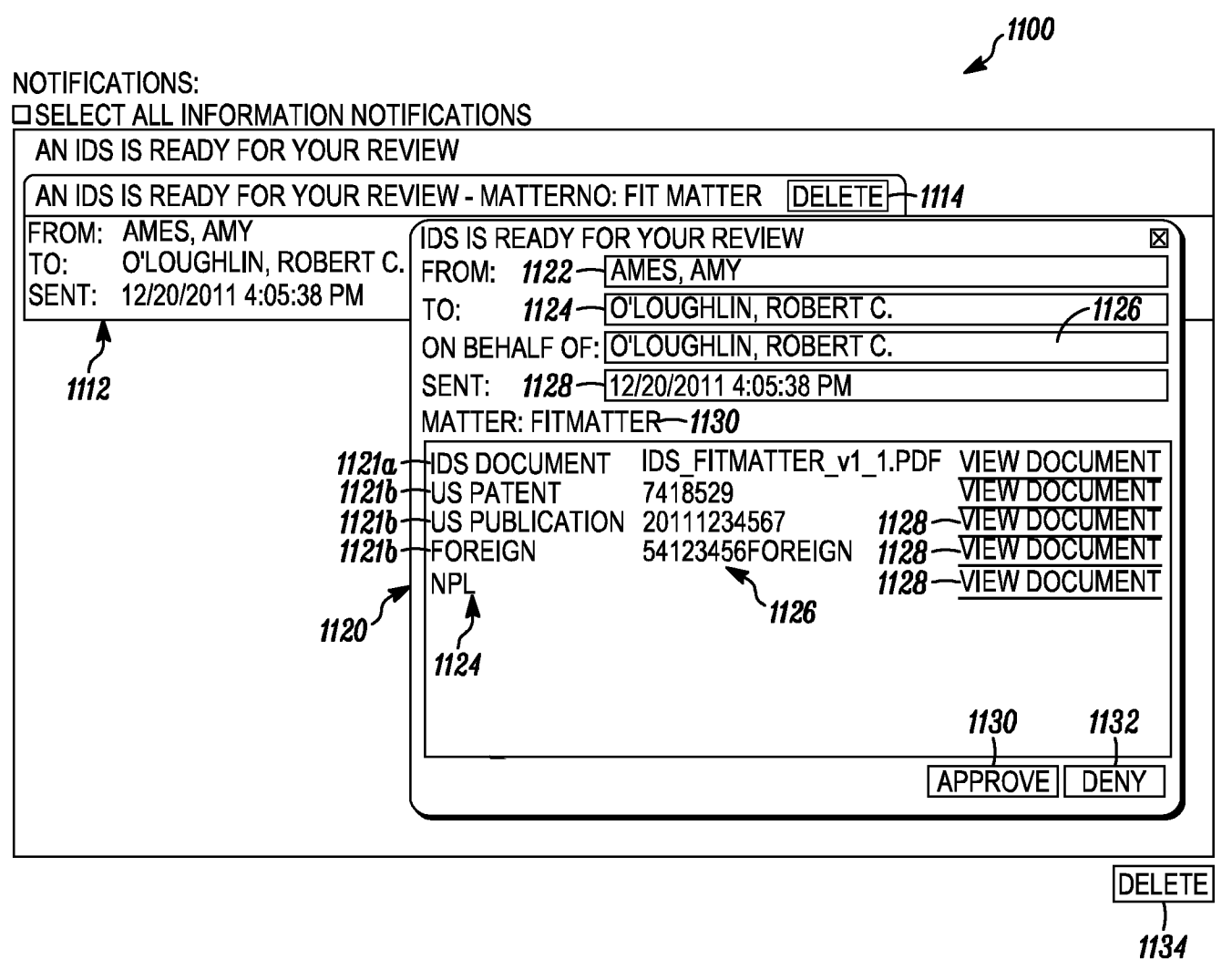

When an IDS filing package has been generated, it may be reviewed by a reviewing user (e.g., a responsible attorney). FIG. 11 illustrates an example of a notifications interface 1100 that can be accessed, for example, by activating the "NOTIFICATIONS" button 224 on the dashboard interface 200. As shown in FIG. 11, the notifications interface 1100 can include any number of notifications, including a notification 1112 of an IDS filing package that is ready to review. The notification 1112 can include any number of different types of information such as, for example, the type of notification, an indication of the "sender" of the notification (e.g., a user that performed actions that resulted in the notification), an indication of the matter to which the notification 1112 is related, and the like. In embodiments, the notification 1112 may also include a "DELETE" button 1114 that can be activated to delete the notification 1112.

In embodiments, the notification 1112 can be selectable. Upon selection of the notification 1112, an IDS review interface 1120 can be presented to the reviewing user. The IDS review interface 1120 can be presented as a "pop-up" dialog box, an interaction region within the notifications interface 1100, a separate interface, or the like. As shown in FIG. 11, the IDS review interface 1120 includes a sender indicator 1122 that identifies a "sending" user, a recipient indicator 1124 that identifies a receiving user (e.g., an attorney that is responsible for reviewing the IDS), a supervisor indicator 1126 that identifies a user on whose behalf the IDS filing package was generated, a date indicator 1128 that indicates the date (and, in embodiments, time) that the notification was sent (e.g., generated), and a matter indicator 1130 that indicates the corresponding matter. The illustrated IDS review interface 1120 also includes a listing of documents that are associated with the IDS filing package. For example, as shown in FIG. 11, the listing 1132 includes a representation 1121a of the completed IDS form ("IDS DOCUMENT") and a representation 1121b of each of the associated references. The listing 1132 depicted in FIG. 11 includes, for each representation, a document-type indicator 1124, an identifier 1126 (e.g., title, key value, etc.), and a selectable representation 1128 that, when selected by the user, causes the corresponding document to be displayed. In this manner, the user can review the listing as well as the individual documents associated with the IDS filing package. In embodiments, the configuration of the IDS review interface 1120 can be varied in any number of ways from the depiction of FIG. 11.

In the illustrated embodiments, after reviewing the listing of documents and/or one or more of the corresponding documents, the reviewing user can either approve or deny the IDS filing package by selecting one of two selectable options: "APPROVE" 1130 and "DENY" 1132. In embodiments, any number of other options may be provided for selection. Upon selecting the approve option 1130, the selection is communicated to the interaction server, which, in response to receiving the selection of the approve option 1130, can notify a filing user that the IDS filing package is ready to be filed. This notification can be presented in a dashboard interface 200, an email message, or the like. In embodiments, a filing user can be a user that is designated for filing IDSs with the appropriate patent office. Depending upon the particular implementation, a filing user can be, for example, an administrative specialist tasked with filing IDSs, a responsible attorney, an administrative assistant, or the like. Additionally, in embodiments, a notification sent to a filing user can include a selectable option for downloading the IDS filing package such that, upon receiving a user selection of that option, the interaction server causes the completed IDS form and each of the cited references to be saved to the user's computing device, to a location on a document management system, or the like. Additionally, upon receiving a selection of the deny option 1132, the interaction server can cancel the IDS generation and return all of the references to a pending status so that the process of generating the IDS filing package can be started again. Furthermore, in embodiments, upon receiving a selection of the approve option 1130, the interaction server can automatically push each of the cited references to each of the matters in the same clan (or clans) as the matter to which the IDS corresponds.

Figure 12:
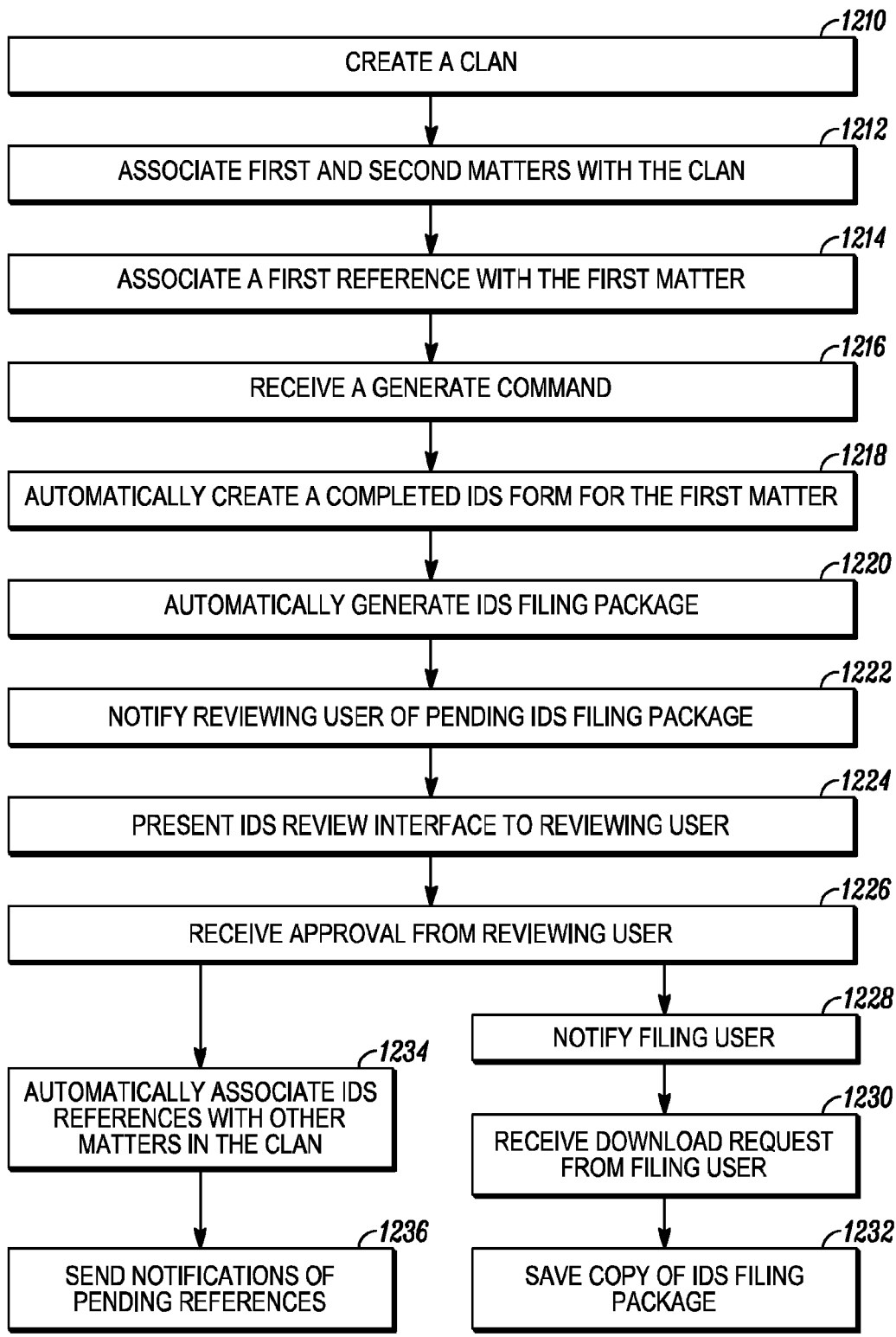
FIG. 12 is a flow diagram depicting an illustrative method for managing references associated with patent applications in accordance with embodiments of the invention.

FIG. 12 is a flow diagram depicting an illustrative method of managing references associated with a number of patent applications (e.g., matters) in accordance with embodiments of the invention. In embodiments of the method, a user creates a clan (block 1210). For example, in embodiments, a clan can be created using, for example, a customization interface (e.g., customization interface 400 depicted in FIG. 4) that is rendered by a browser (e.g., browser 114 depicted in FIG. 1). Creating a clan can include defining a name for the clan and, in embodiments, providing a description of the clan. A first matter and a second matter are associated with the clan (block 1212) and a first reference is associated with the first matter (block 1214). Of course, in embodiments, any number of matters may be associated with a clan and, similarly, any number of references may be associated with a matter.

As depicted in FIG. 12, an interaction server (e.g., interaction server 110 depicted in FIG. 1) receives a generate command (block 1216), which, for example, can be communicated to the interaction server in response to a user activating a generate button on a view matter interface (e.g., view matter interface 800 depicted in FIG. 8). In other embodiments, the interaction server can receive a generate command via an email message or other type of communication. In response to receiving the generate command, the interaction server automatically creates a completed IDS form for the first matter (block 1218). According to embodiments, the interaction server completes the IDS form by populating a number of input fields of an information disclosure statement (IDS) form. The IDS form can include an authorized fillable form provided by a patent office, a letter (e.g., for reporting references to a foreign patent office, a foreign associate, etc.), or any other type of document that can be used to disclose references related to a patent application. In embodiments, one or more of the input fields is populated with descriptive data corresponding to the first reference. Similarly, other input fields can be populated with descriptive data corresponding to any other reference that is to be cited in the IDS form. In embodiments, application data (e.g., data corresponding to the patent application with respect to which the IDS form is to be filed) can be automatically populated by the interaction server such as, for example, by retrieving such information from a docketing system, database, or the like. In the illustrated embodiment, the interaction server automatically generates, in response to receiving the generate command, an IDS filing package (block 1220), which includes the completed IDS form and the first reference (and any additional references disclosed in the completed IDS form).

In embodiments of the method, the interaction server notifies a reviewing user (e.g., an attorney) of the pending IDS filing package (block 1222). The notification can be presented to the reviewing user on a dashboard interface (e.g., dashboard interface 200 depicted in FIG. 2), sent to a reviewing user via email, some other messaging technology, a combination of these, or the like. In embodiments, other users may also be notified of the pending IDS filing package. According to the illustrative method depicted in FIG. 12, an IDS review interface is presented to a reviewing user (block 1224). For example, a reviewing user can select the notification (in embodiments in which the notification is presented as a selectable item) to cause an IDS review interface to be presented (e.g., review interface 1120 depicted in FIG. 11), the reviewing user can navigate to the IDS review interface, or the like.

In embodiments, the IDS review interface can include a listing of the documents associated with the IDS filing package. The listing can include, for example, representation of the completed IDS form and a representation of the first reference. In embodiments, these representations are selectable such that selection of the representation of the completed IDS form causes the completed IDS form to be displayed and selection of the representation of the first reference causes the first reference to be displayed. In this manner, a reviewing user can review the listing of documents, the completed IDS form, and the references. Additionally, in embodiments, the displayed completed IDS form includes a signature input field such that, upon determining that the completed IDS form is satisfactory, a reviewing user can add an electronic signature to the completed IDS form before approving the IDS. In embodiments, a signature (e.g., an electronic signature) can be added to the completed IDS form after the IDS filing package is downloaded onto a filing user's computing device.

In embodiments, the IDS review interface includes a set of selectable options such as an approve option and a deny option. If a reviewing user selects the deny option, the IDS can be canceled. According to embodiments of the method depicted in FIG. 12, the interaction server receives an approval from the reviewing user (block 1226). Additionally, in embodiments, upon receiving the approval, a filing user is notified that the IDS filing package is ready to be filed (block 1228). The notification can be presented to the filing user on a dashboard interface (e.g., dashboard interface 200 depicted in FIG. 2), sent to the filing user via email or some other messaging technology, or a combination of these. In embodiments, other users may also be notified that the IDS filing package is ready to be filed.

As indicated in FIG. 12, the interaction server receives a download request from a filing user (block 1230) and, in response to receiving the download request, the interaction server provides a copy of the IDS filing package, which can be saved on the filing user's computing device (block 1232). In embodiments, the download request can be communicated to the interaction server in response to a filing user selecting a selectable option for downloading the IDS filing package. The selectable option can be provided, for example, in a notification that a filing user receives, in a separate email, in a drop-down menu, or the like.

In embodiments, the interaction server automatically associates an indication with the first reference that the IDS filing package has been approved. As a result, when the interaction server presents a view matter interface corresponding to the first matter, the view matter interface can include an indication that the first reference has been included in the IDS filing package. In embodiments, the interaction server also automatically associates the references disclosed in the IDS filing package with all of the other matters associated with the clan (block 1234). As a result, when the interaction server presents a view matter interface corresponding to a second matter of the same clan, for example, the view matter interface can include an indication that the first reference is pending with respect to the second matter (e.g., has not been included in an IDS filing package associated with the second matter, but is associated with the second matter). Additionally, the interaction server notifies various users that the references are now pending with respect to the second matter (and any other matter within the clan) (block 1236).

Embodiments of the disclosed subject matter are described in the general context of computer-executable instructions. Computer-executable instructions can include, for example, computer code, machine-useable instructions, and the like such as, for example, program components, capable of being executed by one or more processors associated with a computing device. Generally, program components including routines, programs, objects, modules, data structures, and the like, refer to code that, when executed, causes a computing device to perform particular tasks (e.g., methods, calculations, etc.) or implement or manipulate various abstract data types. Some or all of the functionality contemplated herein can also be implemented in hardware and/or firmware.

Computer-readable media include both volatile and non-volatile media, removable and nonremovable media, and contemplate media readable by a database, a processor, a router, and various other networked devices. By way of example, and not limitation, computer-readable media can include media implemented in any method or technology for storing information. Examples of stored information include computer-executable instructions, data structures, program modules, and other data representations. Media examples include, but are not limited to, Random Access Memory (RAM); Read Only Memory (ROM); Electronically Erasable Programmable Read Only Memory (EEPROM); flash memory or other memory technologies; Compact Disc Read-Only Memory (CD-ROM), digital versatile disks (DVDs) or other optical or holographic media; magnetic cassettes, magnetic tape, magnetic disk storage or other magnetic storage devices; data transmissions; or any other medium that can be used to encode information and can be accessed by a computing device such as, for example, quantum state memory, and the like.

Embodiments may be practiced in a variety of system configurations, including handheld devices, general-purpose computers, specialty computing devices, servers, workstations, etc. Embodiments may also be practiced in distributed computing environments where tasks are performed by a number of computing devices that are linked through a communications network. According to embodiments, a computing device can include any type of computing device suitable for implementing embodiments of the invention. Examples of computing devices include "workstations," "servers," "laptops," "desktops," "tablet computers," "hand-held devices," and the like, all of which are contemplated within the scope of FIG. 1 and reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components can also be included in the computing device. The bus represents what may be one or more busses (such as, for example, an address bus, data bus, or combination thereof). Similarly, in embodiments, the computing device can include a number of processors, a number of memory components, a number of I/O ports, a number of I/O components, and/or a number of power supplies. Additionally any number of these components or combinations thereof can be distributed and/or duplicated across a number of computing devices.

Any number of other various types of embodiments may be contemplated within the ambit of the invention. Accordingly, the scope of the present invention is intended to embrace all such alternatives, modifications, and variations as fall within the scope of the claims, together with all equivalents thereof. While the subject matter of embodiments of the inventions disclosed herein is described with specificity, the specific description itself is not intended to limit the scope of this patent. Rather, the inventors have contemplated that the claimed subject matter might also be embodied in other ways, to include different steps or features, or combinations of steps or features similar to the ones described in this document, alone or in conjunction with other technologies, methods, apparatuses, and systems, some of which are described herein. Moreover, although the term "block" may be used herein to connote different elements of methods employed, the term should not be interpreted as implying any particular order among or between various steps herein disclosed unless and except when the order of individual steps is explicitly called for.

The following is claimed:

1. A method of managing references associated with one or more patent applications, the method comprising:
    associating a first matter and a second matter with a clan, wherein the first matter corresponds to a first patent application and the second matter corresponds to a second patent application;
    associating a first reference and a second reference with the first matter;
    receiving, at an interaction server, a generate command;
    populating, at the interaction server, a plurality of input fields of an information disclosure statement (IDS) form to create a completed IDS form, in response to receiving the generate command, wherein at least one of the plurality of input fields includes descriptive data corresponding to the first reference;
    generating, at the interaction server, an IDS filing package, wherein the IDS filing package includes the completed IDS form and the first reference;
    presenting an IDS review interface to a reviewing user, the IDS review interface comprising a representation of the completed IDS form and a representation of the first reference;
    presenting a set of selectable options to the reviewing user, wherein the set of selectable options includes an approve option and a reject option;
    receiving, from the reviewing user, a selection of the approve option;
    notifying a filing user that the IDS filing package is ready to be filed;
    receiving a remove command from the reviewing user, wherein the remove command corresponds to the second reference;
    presenting a set of selectable options to the reviewing user, the set of selectable options comprising a first reason for removing the second reference from the first matter and a second reason for removing the second reference from the first matter;
    receiving, from the reviewing user, a selection of at least one of the first and second reasons;
    removing the second reference from the first matter; and
    associating the at least one selected reason with the second reference.

2. The method of claim 1, further comprising:
    presenting a first view matter interface, wherein the first view matter interface corresponds to the first matter, the first view matter interface comprising a selectable option for displaying references that have been removed from the first matter;
    receiving a selection of the selectable option for displaying removed references; and
    displaying a representation of the second reference, wherein the representation includes an indication that the second reference has been removed from the first matter.

3. The method of claim 1, wherein the reviewing user and the filing user are the same user.

4. The method of claim 1, wherein the representation of the completed IDS form is selectable such that selection of the representation of the completed IDS form causes the completed IDS form to be displayed; and wherein the representation of the first reference is selectable such that selection of the representation of the first reference causes the first reference to be displayed.

5. The method of claim 1, further comprising associating, in response to receiving the selection of the approve option, the first reference with the second matter.

6. The method of claim 1, further comprising presenting a first view matter interface, wherein the first view matter interface corresponds to the first matter, the first view matter interface comprising an indication that the first reference has been included in the IDS filing package.

7. The method of claim 6, further comprising presenting a second view matter interface, wherein the second view matter interface corresponds to the second matter, the second view matter interface comprising an indication that the first reference has been associated with the second matter.

8. One or more computer-readable media having embodied thereon computer-executable instructions for performing a method of managing references associated with one or more patent applications, the method comprising:
    presenting a first interface to a reviewing user, the first interface comprising a first region for displaying notifications and a second region that includes an indication of a matter having an information disclosure statement (IDS) filing package to be reviewed, wherein the IDS filing package includes a completed IDS form and a first reference;
    receiving a user selection of the indication; and
    presenting a second interface to the reviewing user, the second interface comprising:
        a selectable representation of the completed IDS form, wherein selection of the selectable representation of the completed IDS form causes the completed IDS form to be presented to the reviewing user; and
        a selectable representation of the first reference, wherein selection of the selectable representation of the first reference causes the first reference to be presented to the reviewing user;
    receiving a remove command from the reviewing user, wherein the remove command corresponds to a second reference associated with the matter;
    presenting a set of selectable options to the reviewing user, the set of selectable options comprising a first reason for removing the second reference from the matter and a second reason for removing the second reference from the matter;
    receiving, from the reviewing user, a selection of at least one of the first and second reasons;

automatically removing the second reference from the matter; and associating the at least one selected reason with the second reference.

9. The media of claim 8, further comprising:

presenting a selectable option for displaying references that have been removed from the matter;

receiving a selection of the selectable option for displaying removed references; and displaying an indication that the second reference has been removed from the matter.

* * * * *